July 26, 1938.   P. H. CRAGO   2,124,651
REMOTE CONTROL SYSTEM
Filed Aug. 30, 1932   7 Sheets-Sheet 1

INVENTOR.
Paul H. Crago.
By
HIS ATTORNEY.

July 26, 1938.   P. H. CRAGO   2,124,651
REMOTE CONTROL SYSTEM
Filed Aug. 30, 1932   7 Sheets-Sheet 2

INVENTOR.
Paul H. Crago
BY
HIS ATTORNEY.

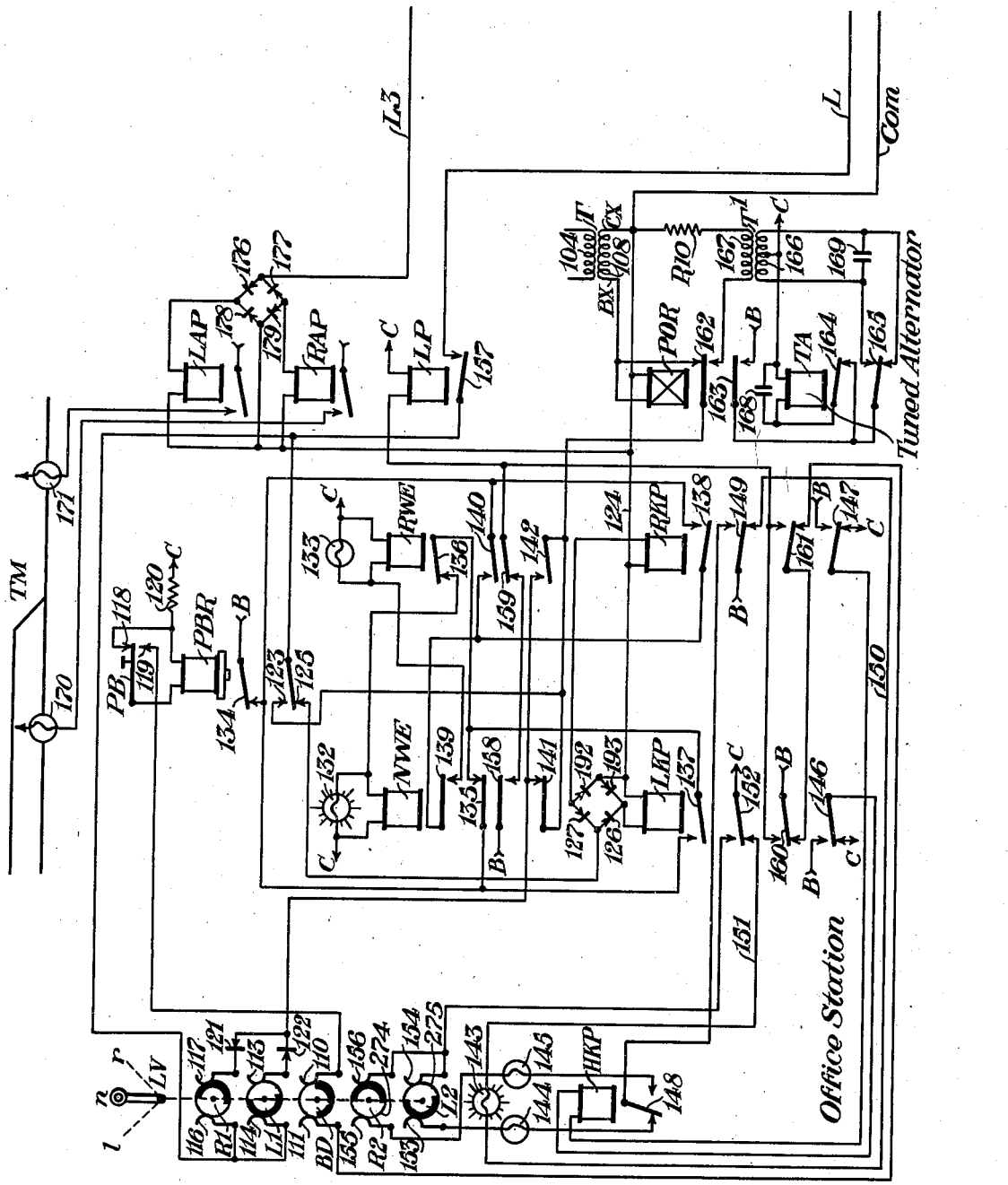

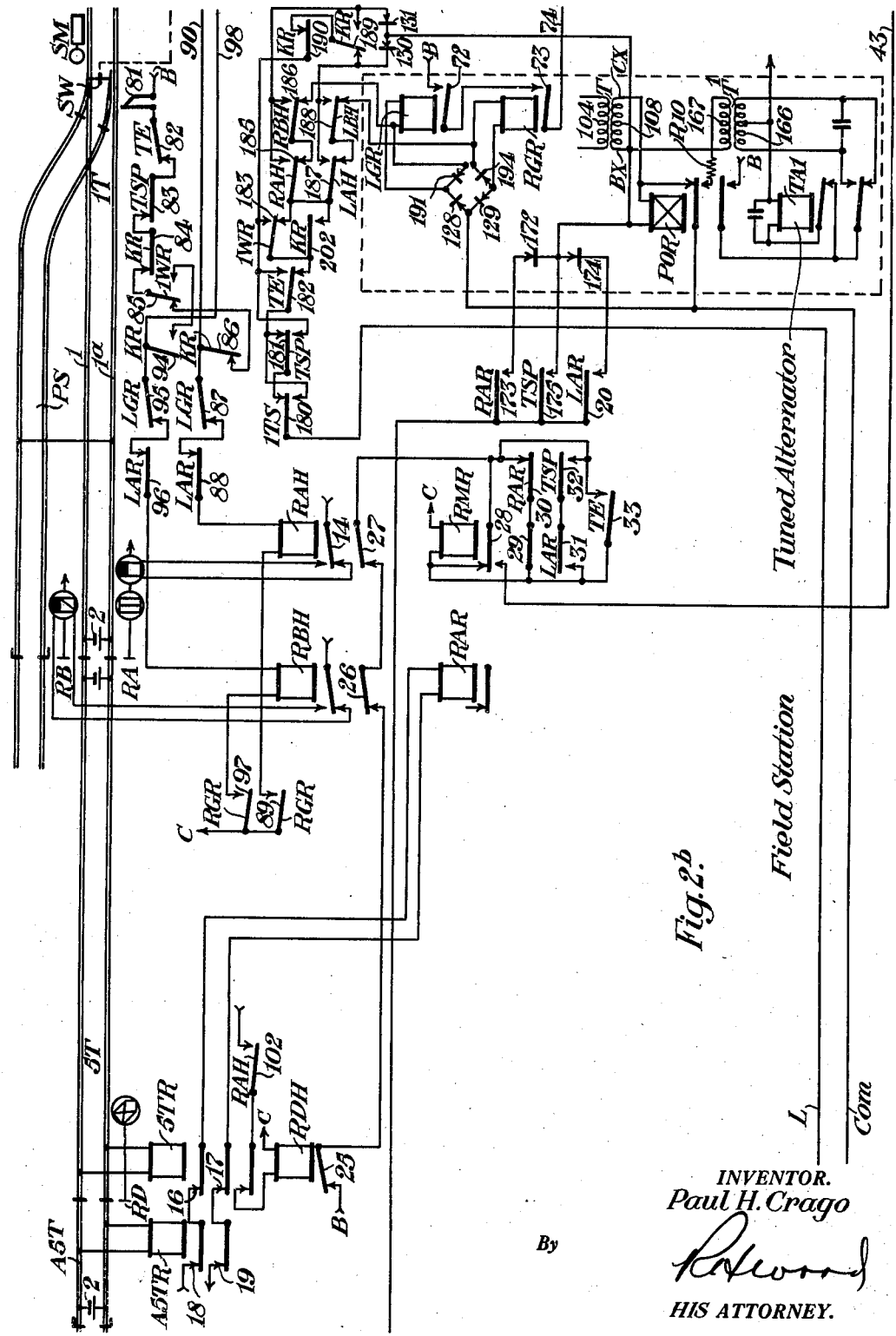
Fig. 2.b

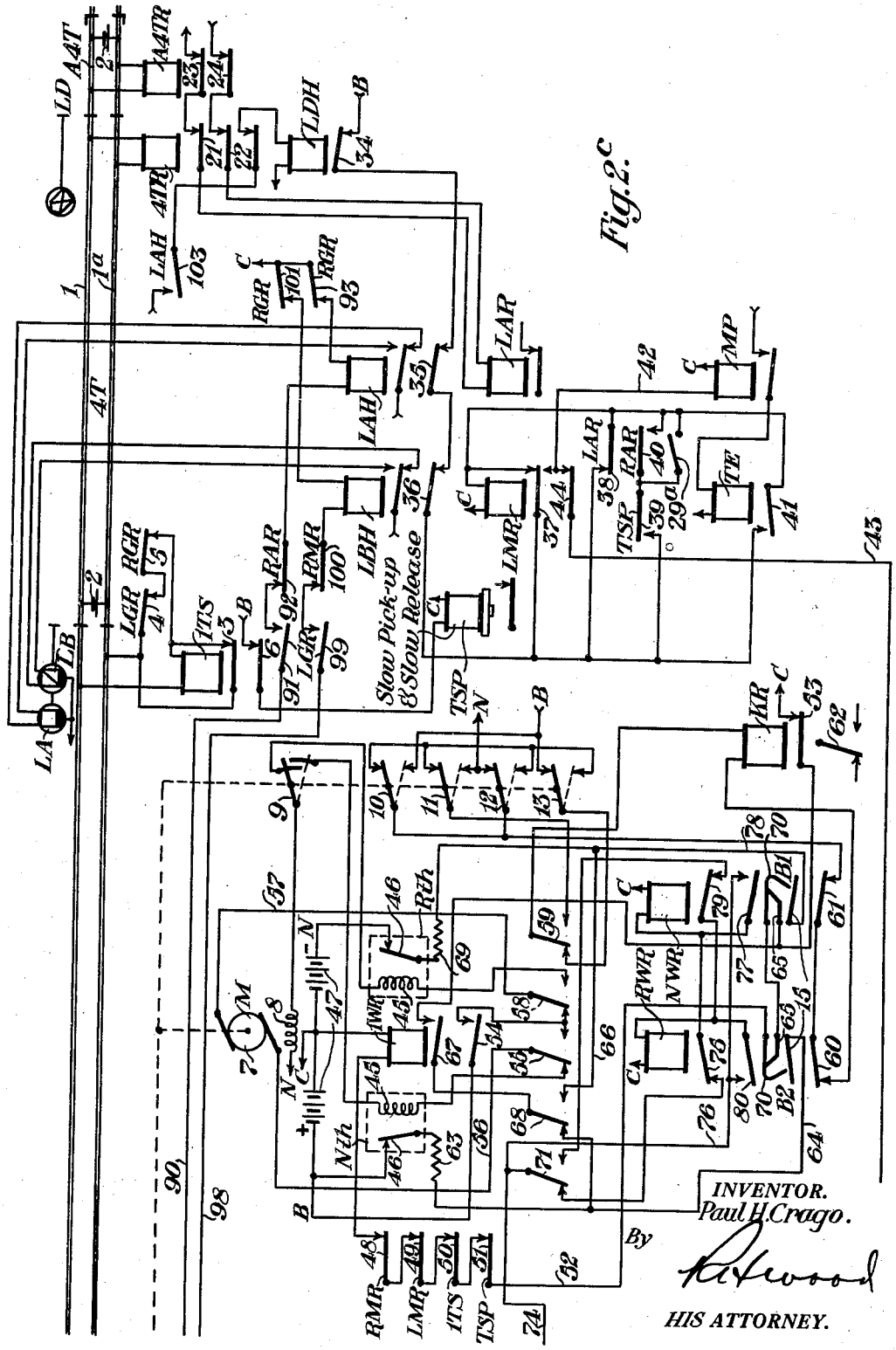

July 26, 1938.   P. H. CRAGO   2,124,651
REMOTE CONTROL SYSTEM
Filed Aug. 30, 1932   7 Sheets-Sheet 6

Selector lever contact on Dual control switch machine.

INVENTOR.
Paul H. Crago.
By
HIS ATTORNEY.

July 26, 1938.  P. H. CRAGO  2,124,651
REMOTE CONTROL SYSTEM
Filed Aug. 30, 1932  7 Sheets-Sheet 7

INVENTOR.
Paul H. Crago.
By
HIS ATTORNEY.

Patented July 26, 1938

2,124,651

UNITED STATES PATENT OFFICE 2,124,651

REMOTE CONTROL SYSTEM

Paul H. Crago, Wilkinsburg, Pa., assignor to The Union Switch & Signal Company, Swissvale, Pa., a corporation of Pennsylvania Application August 30, 1932, Serial No. 631,041

73 Claims. (Cl. 246—3)

My invention relates to remote control systems, and particularly to remote control systems for controlling railway switches and/or signals from a remote point such as a train despatcher's office, and for also communicating to said office the condition of said switches and/or signals and other information, such as the presence of trains in the vicinity of the switches.

One feature of my invention is the provision, in a system of the type described, of novel and improved apparatus that permits the transmitting of different control influences from an office station to a field station and the returning of different indication influences from the field station to the office station over a single communicating channel or circuit. The method whereby this two-way control is accomplished over a single communication circuit consists in providing loop circuits at the two stations each adaptable to pass current in a given direction only, and then causing control and indication currents to so flow in the communication circuit, either simultaneously or at time spaced intervals, that devices governed by the loop circuits are selectively energized. A further feature of my invention is to provide a remote control system involving simple and rugged apparatus operating independently of marginal features as to current, battery voltage balance or time of relay operation. Other features of my invention will become apparent from the following description.

While many applications of my invention will naturally suggest themselves to those skilled in the art, the specific application described in the present specification is that for controlling a single railway switch and its related signals from an office station and indicating at the office station the condition of said switch and signals, the communication channel in this instance consisting of one line wire and a common return wire.

I will describe several forms of apparatus embodying my invention, and will then point out the novel features thereof in claims.

Figure 1:
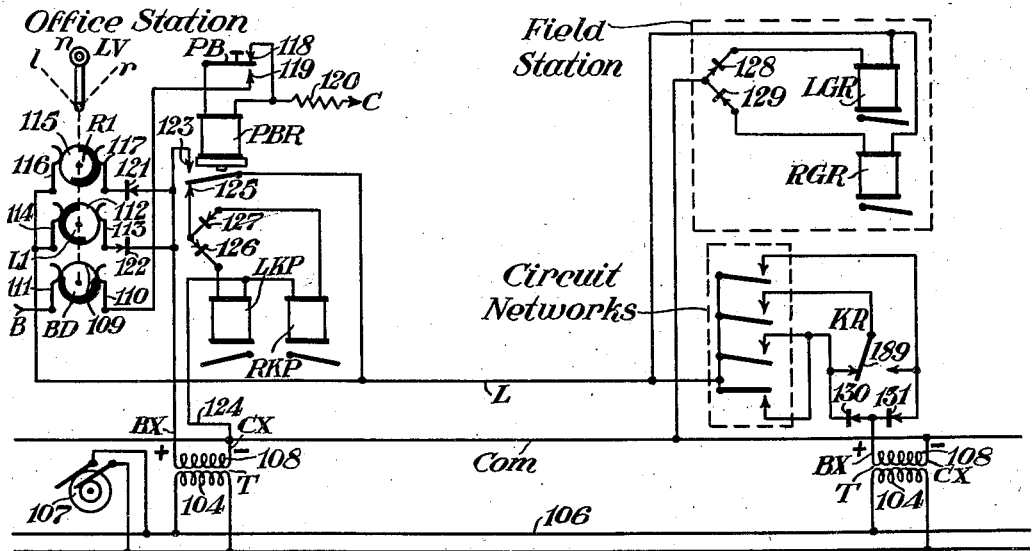
Figure 3:
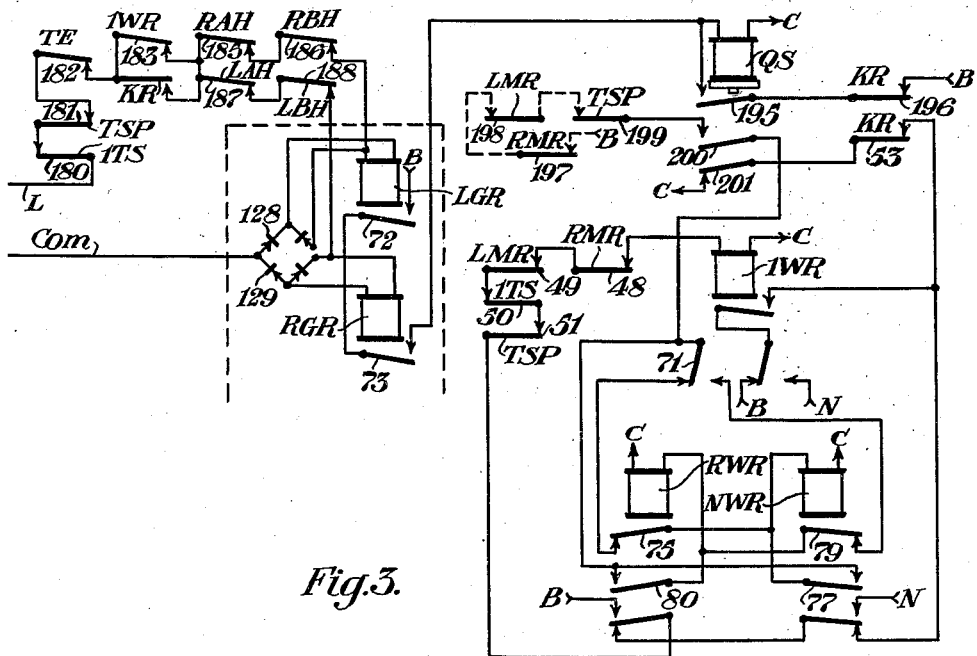
Figure 4:
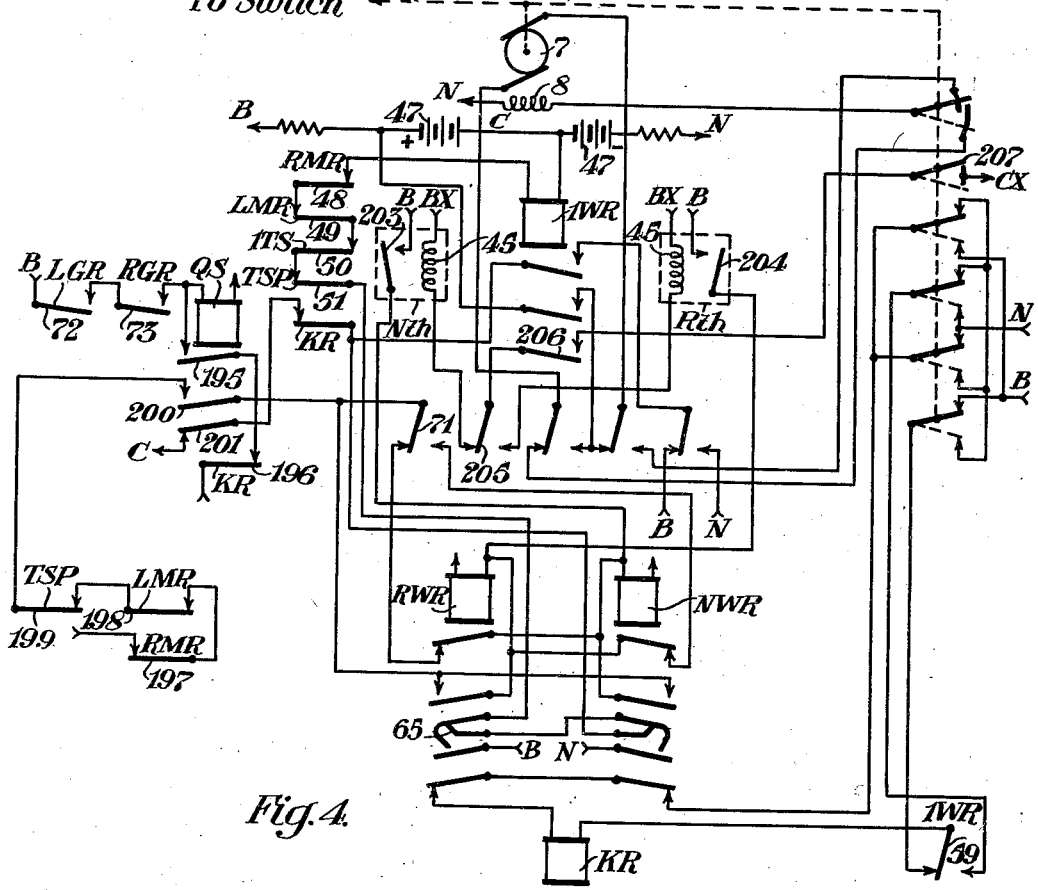
Figure 7:
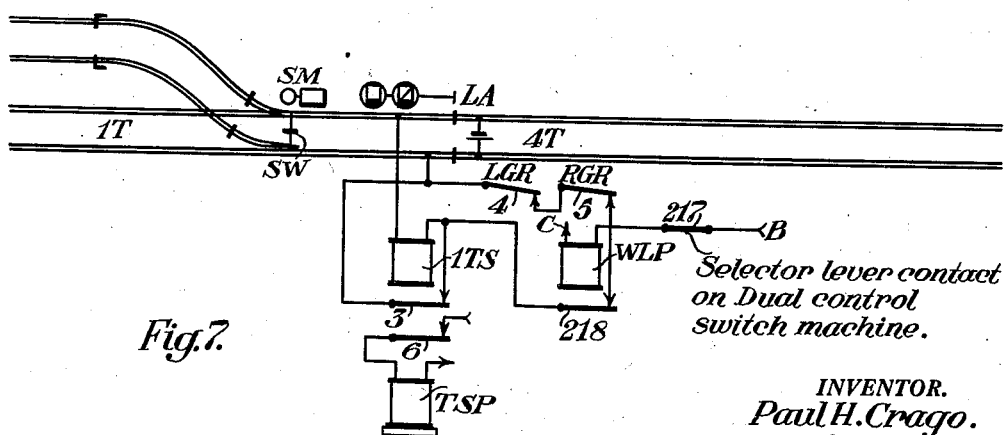
Figure 5:
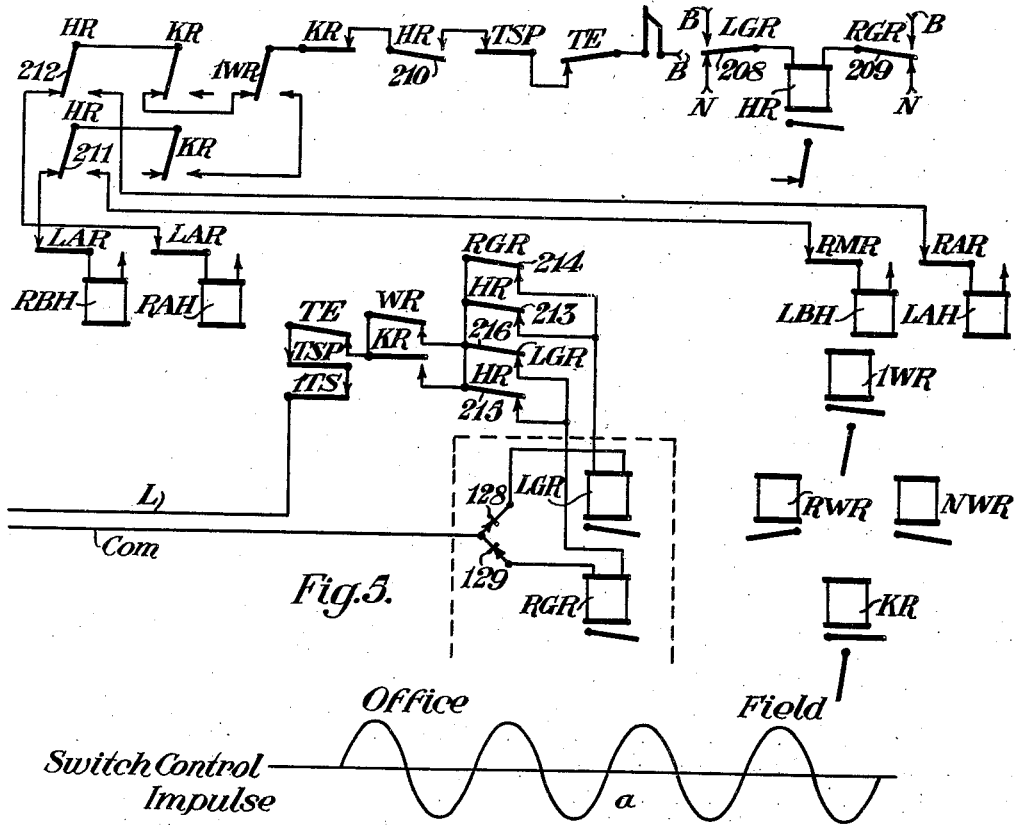
Figure 6:
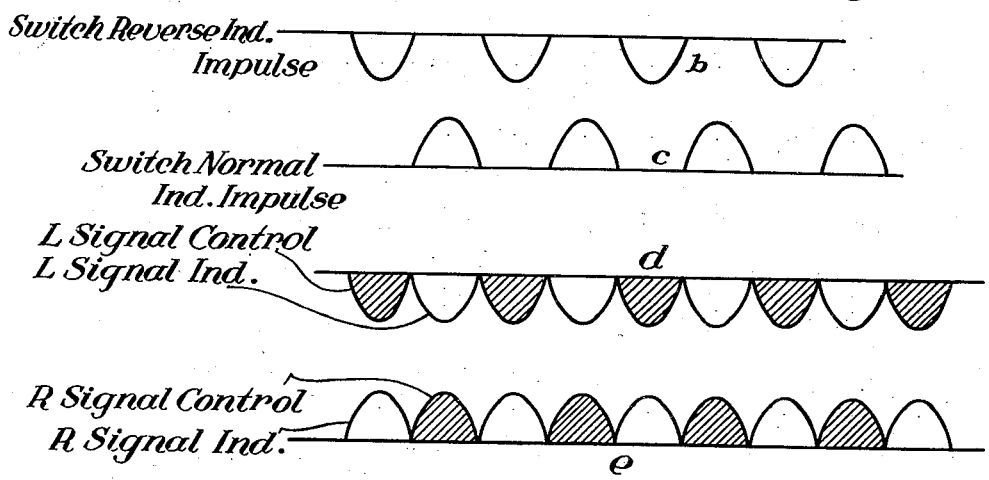

In the accompanying drawings, Fig. 1 is a diagrammatic view of one form of apparatus utilizing alternating current for carrying out the control principle embodying my invention. Fig. 1ª is a diagrammatic view of a second form of apparatus whereby steady direct current is used for carrying out the control principle embodying my invention. Figs. 2ª, 2ᵇ and 2ᶜ when taken together in the order named with Fig. 2ª placed at the left constitute a diagrammatic view of one form of apparatus embodying my invention wherein the control arrangement disclosed in Fig. 1 is applied to the control of a single railway switch and its related signals. Fig. 3 is a fragmental view of a modified form of apparatus that may be employed at the field station for storage of a switch operating control influence. Fig. 4 is a fragmental view of the apparatus at the field station when modified to provide the returning of a switch automatically to its former position in the event the switch points meet an obstruction which prevents the switch from making a complete movement from one position to the other. Fig. 5 is a fragmental view of the apparatus at the field station modified to include a polarized directional signal controlling relay which apparatus also embodies my invention. Fig. 6 is a series of diagrams illustrating the various forms of the impulses of the control and indication currents which are applied to the communication circuit when the control apparatus takes the form disclosed in Fig. 1. Fig. 7 is a fragmental view of a modified form of the field equipment that may be employed when hand operation of the switch is to be permitted.

In each of the several views like reference characters designate similar parts.

To simplify the figures as much as possible in order that they may be more readily understood, I have in many instances illustrated a circuit controlling contact remote from the relay winding governing the operation of that contact. In all such instances the reference character corresponding to the controlling relay is placed just above the contact and the contact is also given a distinctive individual reference character. For example, the circuit controlling contact of Fig. 2ᵇ designated by the reference character 20 is governed by a relay LAR of Fig. 2ᶜ to be fully described later, and this back contact 20 is shown normally open inasmuch as the relay LAR is normally energized as will appear later in the description.

Referring particularly to Figs. 2ᵇ and 2ᶜ, the reference characters 1 and 1ª designate the track rails of a stretch of railway track divided by the usual insulated rail joints to form a main track section 1T which contains a railway switch SW of the usual form leading to a siding track PS. The track rails of the main track adjacent the track section 1T are arranged to form a plurality of approach track sections 4T, A4T, 5T and A5T. Each of these approach track sections is provided with a track circuit including a convenient source of current such as a battery 2 connected across the rails at one end of the section and a track relay designated by the reference character R plus a prefix corresponding to the section connected across the rails at the opposite end of the section. The main track section IT is likewise provided with a similar track circuit except that its track relay ITS is normally held energized by a stick circuit over its own front contact 3. The pick-up circuit for this track relay ITS includes the back contact 4 of a despatcher controlled relay LGR and the back contact 5 of a second despatcher controlled relay RGR in series, both of which relays will be fully described later on. Associated with the track relay ITS is a slow-acting repeater relay TSP, the energizing circuit of which includes the front contact 6 of the relay ITS, so that relay TSP is deenergized whenever the main track section IT is occupied. The repeater relay TSP is both slow to release and slow to pick up, that is, it will not close its front contacts until its winding has been energized for some predetermined time interval as well as its front contacts remain closed for a given time interval after its winding is deenergized. The function of relays ITS and TSP will appear when the operation of the apparatus is described.

Eastbound traffic, that is, traffic moving from the left to the right over the switch SW is governed by signals designated by the reference character R plus a suffix A or B. Westbound traffic, that is, traffic moving from the right to the left over the switch SW is governed by the signals designated by the reference character L plus a suffix A or B, and these two signals LA and LB are both mounted on a single mast. As is standard practice an automatic distant signal RD governs eastbound traffic approaching the signal RA and an automatic distant signal LD governs westbound traffic approaching the signal LA. These signals may be of any suitable form and as here shown are the usual color light signals. As is standard practice the signals RA and LA associated with traffic on the main track are arranged to display a green light when traffic is to proceed and a red light when traffic is to stop. Signals RB and LB associated with traffic moving to and from the siding PS are arranged to display a yellow light for traffic to advance and a red light when traffic is to stop. The distant signals RD and LD will display green, yellow or red lights, green when the associated signal in advance is in the clear position, yellow when the signal in advance is at stop and red when the track section immediately in advance is occupied.

The operating circuit for each signal is governed by a signal controlling relay designated by the reference character H plus a prefix corresponding to the signal. Referring to the signal controlling relay RAH, when this relay is deenergized and its back contact 14 is closed, the circuit to the red light for signal RA is completed and when the relay is energized and its front contact 14 is closed, the circuit to the green light of signal RA is completed. In a similar manner each of the signal controlling relays of my system govern the operating circuits for the associated signal. For the sake of simplicity the operating circuits for the distant signals RD and LD are not shown as they form no part of my invention.

The switch SW is adapted to be operated, as indicated by a dotted line, by the motor M of a switch machine SM of any of the standard types. The motor M includes an armature 7 and a field winding 8, and is controlled in part by means under the control of a despatcher at a remote office. As here shown the immediate control of the motor M, and thus of the switch SW is accomplished by a polarized switch controlling relay IWR which relay is jointly controlled, as will be described hereinafter, in accordance with a control impulse transmitted from the despatcher's office and in accordance with traffic conditions of the several associated track sections.

The switch SW operates a plurality of circuit controlling contacts 9, 10, 11, 12 and 13. With the switch set normal for traffic on the main track these several contacts occupy their full line positions, and when the switch is reversed for traffic to move to and from the siding PS, these contacts are moved to their respective dotted line positions.

Assuming the relay IWR to be energized, in a manner to be fully described hereinafter, with current of a polarity which I will call reverse polarity, its polar armatures will be held in the right-hand position, that is, in a position opposite that shown in Fig. 2c, to complete a reverse operating circuit for the motor M. This reverse operating circuit extends from the positive terminal B of a battery 47 through front contact 54 of relay IWR, right-hand contact of polar armature 55, wire 56, armature 7, wire 57, right-hand contact of polar armature 58, winding 45 of a thermosensitive relay R*th* to be later described, circuit controlling contact 9, field winding 8 and to the negative terminal N of the battery 47. With this reverse operating circuit thus closed the motor M rotates in a direction to actuate switch SW from its normal to its reverse position, the circuit being automatically opened at the circuit controlling contact 9 when the switch is in the full reverse position. Assuming the relay IWR to be energized with current of a polarity which I will call normal polarity, its polar armatures are held in the left-hand position, that is, in the postion shown in Fig. 2c, and current is supplied to a normal operating circuit for motor M. This normal operating circuit extends from the terminal B of battery 47 through front contact 54, left-hand contact of polar armatures 58, wire 57, motor armature 7, wire 56, left-hand contact of polar armature 55, winding 45 of a second thermosensitive relay N*th*, circuit controlling contact 9, assuming the switch SW to be in the reverse position, field winding 8 and to the negative terminal N of the battery 47. The direction of flow of current in the armature 7 being now in the direction opposite to that first described, the motor M is rotated in the reverse direction to operate the switch from its reverse to its normal position, this normal circuit being automatically opened at the circuit controlling contact 9 when the switch is in the full normal position. Thus it follows that with relay IWR energized with current of normal polarity the switch is set normal and when the relay IWR is energized with current of reverse polarity, the switch is set reverse.

Associated with the circuit controlling contacts 10, 11, 12 and 13 is a polarized switch indication relay KR. With the switch SW normal, the relay KR is energized by virtue of a circuit that includes the B terminal of battery 47, contact 13, left-hand contact of polar armature 59 of relay IWR, winding of relay KR, back contacts 60 and 61 of relays RWR and NWR, respectively, to be shortly described, contact 12 and to the negative terminal N. The polarity of the current supplied by this circuit is such as to cause the polar armatures of the relay KR to be retained in the left-hand position. That is to say, with switch SW in its normal position the relay KR is energized with current of what I will call normal polarity. Taking the switch SW to be in its reverse position, then current is supplied from the B terminal through contact 10, back contacts 61 and 60, winding of relay KR, right-hand contact of polar armature 59, and contact 11 to the negative terminal N. The direction of flow of current in the winding of relay KR being reverse from that for the circuit first traced, the relay KR is energized with its polar armatures held in the right-hand position. In accordance with the usual practice the winding of the relay KR is short-circuited at the contacts 10, 11, 12 and 13 whenever the switch occupies any intermediate position as will be readily understood by an inspection of Fig. 2c. It follows that relay KR is energized with current of normal polarity when the switch is normal, and with current of reverse polarity when the switch is reverse. It is to be noted that the relay KR is deenergized upon the energizing of either of the relays RWR or NWR so as to open either one of the back contacts 60 or 61. Furthermore, it is to be observed that in order for the relay KR to be energized there must exist agreement as to position between the polar armature 59 of the relay IWR and the circuit controlling contacts 10, 11, 12 and 13.

Still referring to Figs. 2b and 2c, RAR is an approach relay associated with eastbound traffic, the circuit for which is controlled by the front contacts 16 and 17 of the track relay 5TR and the front contacts 18 and 19 of the track relay A5TR of the approach sections 5T and A5T, respectively. In like manner the approach relay LAR is associated with westbound traffic and its circuit includes front contacts 21 and 22 of track relay 4TR and front contacts 23 and 24 of track relay A4TR for the approach sections 4T and A4T, respectively.

The reference character RMR designates the usual approach locking relay associated with eastbound traffic. The manner of controlling the approach locking relay RMR may be in accordance with any of several methods commonly used, but as here shown it is normally retained energized by a stick circuit that extends from the positive terminal B of a convenient source of current such as a battery not shown, back contacts 25, 26 and 27 of signal controlling relays RDH, RBH and RAH, respectively, its own front contact 28, winding of relay RMR and to the negative terminal C of the same source of current. Relay RMR is provided with a pick-up circuit that includes three branch paths around its own front contact 28. One path includes a contact 29 actuated by the switch SW and closed only when the switch occupies its normal position, and the front contact 30 of the approach relay RAR. The second branch path includes the back contact 31 of the opposing approach relay LAR and the back contact 32 of the track repeater relay TSP. The third branch path includes the front contact 33 of a time element relay TE to be described later. It is clear that when any one of the signal controlling relays RAH, RBH or RDH is once energized to clear its associated signal, the stick circuit for the approach locking relay RMR is opened and that relay deenergized after which it can be reenergized only when the signal controlling relays are all down and one of the branch paths mentioned above is closed.

Associated with westbound traffic is the approach locking relay LMR that is normally retained energized by a stick circuit similar to that described for the relay RMR and which includes the back contacts 34, 35 and 36 of the signal controlling relays LDH, LAH and LBH, respectively, and its own front contact 37. The pick-up circuit for the approach locking relay LMR includes three branch paths around its own front contact 37. The first path includes the front contact 38 of the approach relay LAR, the second path includes the back contact 39 of the track repeater relay TSP and the back contact 40 of the opposing approach relay RAR in series, there being a contact 29a, operated by switch SW and closed only when the switch is in its reverse position, arranged in parallel with the contact 40. The third path includes the front contact 41 of the time element relay TE. Thus, the approach locking relay LMR is deenergized whenever any one of the signal controlling relays associated with westbound traffic is picked up and once the relay LMR is deenergized it can be again picked up only when these signal controlling relays are all down and one of the branch paths just mentioned is closed.

Associated with these two approach locking relays RMR and LMR is a relay MP. The relay MP can be supplied with current by either one of two circuits. Assuming relay LMR to be deenergized, a circuit is completed from the terminal B at a signal location LD, through back contacts 34, 35 and 36 in series, back contact 37 of the relay LMR, wire 42, winding of relay MP to the negative terminal C. With the relay LMR picked up but the approach locking relay RMR down, a circuit is closed from the terminal B at the signal location RD through the back contact 25, 26 and 27 in series, back contact 28 of relay RMR, wire 43, front contact 44 of relay LMR, wire 42, winding of relay MP to the terminal C. Whenever the relay MP is energized, current is supplied by a simple circuit to the winding of the time element relay TE. While relay TE may be any one of several different types of time element devices, it is here shown as a relay that closes its front contacts a predetermined time interval after its winding is energized and has a check contact to be referred to later which is closed in the deenergized position of the time element device, but opens when the relay is first energized. As stated above, the manner of controlling the approach relays RAR and LAR, the approach locking relays RMR and LMR, the relay MP and the time element device TE may be any one of several customary schemes employed in systems of the type here involved, and the form here shown for the control thereof is only one of the several alternative forms that may be employed.

The polarized switch controlling relay IWR is normally deenergized and is of the type that its polar armatures remain firmly held in the position to which they were last moved during the time the relay is deenergized. Not only is this relay normally deenergized but its winding is normally short circuited as an extra precaution against a false operation and also to give the relay slow release characteristics under certain operating conditions as will later appear. To be explicit, one terminal of the winding of relay IWR is connected directly to the center C connection of battery 47 and its other terminal is normally connected through a circuit network including front contacts 48, 49, 50 and 51 of relays RMR, LMR, ITS and TSP, respectively, wire 52, contact 70—65 of continuity transfer contact B2 to be later described of relay RWR, contact 76—65 of continuity transfer contact B1 of relay NWR, front contact 53 of the switch indication relay KR and thence to the center C connection of battery 47. For the actual control of the switch controlling relay 1WR, I provide two neutral relays RWR and NWR and two thermosensitive relays N*th* and R*th*, each of the latter being provided with a heating element 45 and a contact 46 controlled thereby. The relays RWR and NWR are normally deenergized and are under the control of the despatcher at the remote office as will shortly appear. When the relay RWR is selected, a circuit is closed for energizing the relay 1WR with current of normal polarity. When the relay NWR is selected, a circuit is closed to supply current of reverse polarity to the winding of the relay 1WR. Assuming relay NWR to be selected, the circuit for relay 1WR extends from the N terminal of battery 47 through contact 46 of the thermosensitive relay R*th*, resistance 69, wire 78, front contact 15 of continuity transfer contact B1 of relay NWR, contact 70—65 of continuity transfer contact B2 of relay RWR, wire 52, front contacts 51, 50, 49 and 48 in series, winding of relay 1WR and to the center C connection of the battery 47. As stated above, I have elected that the current supplied by this circuit is of reverse polarity and thus the polar armatures of the relay 1WR will be shifted to the right-hand position. While there normally existed a short circuiting path from the back contact 65 of relay NWR through the front contact 53 of the relay KR, it is to be noted that whenever the relay NWR is selected, this short circuit path is ruptured first at the back contact 65 and then later at the front contact 53 of relay KR, due to the fact that the relay KR is deenergized by the opening of the back contact 61 as the relay NWR picks up. For purposes to later appear, relays NWR and RWR are preferably pivoted with continuity transfer contacts B1 and B2, respectively. In each contact B1 and B2 the upper member 70 serves as a transfer element, the middle element 65 serves as a back contact which mates with the transfer element during deenergized periods of the relay, and the lower element 15 is what is ordinarily designated as the front contact and mates with the transfer element 70 during the energized period of the relay. Thus, when the relay becomes energized, the lower member 15 must of necessity make contact with the transfer element 70 before the contact between the transfer element and the back contact 65 can be broken. Once the relay 1WR is energized by the selecting of the relay NWR as pointed out above, a stick circuit is provided to hold the relay 1WR energized after the relay NWR drops. This stick circuit branches from wire 78 along the wire 66, right-hand contact of its own polar armatures 68, front contact 67, contact 70—65 of contact B1 of relay NWR, assuming this relay to be now deenergized, contact 70—65 of contact B2 of relay RWR, wire 52, front contacts 51, 50, 49 and 48, winding of relay 1WR and to the center C connection of battery 47. Thus, the energizing of relay NWR for a relatively short period of time in a manner to be later described, will open the normal short circuit on the winding of the relay 1WR, and supply to that relay, current of reverse polarity causing its polar armatures to be shifted to the reverse position, and it will also deenergize the switch indication relay KR. Once energized with current of reverse polarity the relay 1WR is provided with a stick circuit to retain that relay energized after the relay NWR has become deenergized. In connection with the deenergizing of relay NWR, it is to be noted that contact B1 of the relay NWR prevents the opening of the energizing circuit for the relay 1WR at the front contact 15 before the stick circuit is completed at the back contact 65 of relay NWR. It is to be further noted that after the polar armature 59 of the relay 1WR is shifted to its reverse position, the relay KR can not again be picked up until there is agreement brought about by the shifting of the circuit controlling contacts 10, 11, 12 and 13. As pointed out above, the energizing of the relay 1WR with current of reverse polarity causes the motor M to operate the switch from its normal position to its reverse position. When the switch SW is fully reversed, the reverse circuit for the relay KR is completed and relay KR is again picked up, assuming relay NWR to be now deenergized as will appear later. The closing of front contact 53 of relay KR closes the short circuit to the winding of relay 1WR and that relay becomes deenergized, releasing its neutral armatures with a slow release action but, however, retaining its polar armatures in the reverse position. It follows that the applying of current of reverse polarity to the relay 1WR is controlled in part by the relay NWR and in part by the circuit network controlled by the relays RMR, LMR, 1TS and TSP, which relays are responsive to traffic conditions as described hereinbefore.

Selecting the relay RWR, opens the circuit to the relay KR at its back contact 60, opens the short circuit for the winding of relay 1WR at the back contact 65 of contact B2 and closes an energizing circuit for the relay 1WR that can be traced from the positive terminal B of the battery 47 through contact 46 of the thermosensitive relay N*th*, resistance 63, wire 64, front contact 15 of contact B2 of relay RWR, wire 52, contacts 51, 50, 49 and 48, winding of relay 1WR and to the center C connection of the battery 47. The polarity of the current now supplied to the winding of relay 1WR is of normal polarity and the polar armatures of relay 1WR are shifted to their normal positions. The stick circuit for relay 1WR now extends from wire 64 through the left-hand contact of polar armature 68, front contact 67, contacts 70—65 of both B1 and B2 and thence as before traced through the traffic controlled circuit network and the winding of relay 1WR to the center C connection of battery 47. Relay RWR being provided with continuity transfer contact B2, the relay 1WR when picked up in response to the selecting of the relay RWR for a short period of time is retained energized over its stick circuit after relay RWR becomes deenergized. With relay 1WR energized with current of normal polarity the motor M actuates the switch to its normal position and when the normal position is thus reached, the circuit for supplying the relay KR with current of normal polarity is completed assuming relay RWR is now deenergized as will later appear. As relay KR picks up, the short circuit for the winding of relay 1WR will again be closed at the front contact 53 of relay KR and relay 1WR will become deenergized releasing its neutral armatures with a slow-release action, but retaining its polar armatures in the left-hand position.

To sum up, the selecting of the relay NWR for a short period of time removes the short circuit on the relay 1WR, deenergizes the KR relay and energizes relay 1WR with current of reverse polarity providing traffic conditions are normal.

When the switch is fully reversed, the relay KR is again picked up and the short circuit from relay IWR is again closed causing it to be slowly released. When the switch SW is in its reverse position and relay IWR reversed, the selecting of the relay RWR for a short period of time opens the short circuit on relay IWR, deenergizes the KR relay and supplies the winding of relay IWR with current of normal polarity. When the switch is full normal, the short circuit for relay IWR is again closed to cause the relay IWR to be slowly released.

In the event the polar armature 71 of relay IWR occupies its left-hand position due to the fact that that relay was last energized with current of normal polarity, the relay NWR is prepared to be selected by the despatcher at the remote office. The local circuit for selecting relay NWR includes the terminal B of the current source, front contacts 72 and 73 of the despatcher controlled relays LGR and RGR, respectively, to be controlled in a manner to be shortly described, wire 74, left-hand contact of polar armature 71, back contact 75 of relay RWR, winding of relay NWR, to the terminal C of the same source of current. During the interval the despatcher controlled relays LGR and RGR remain up after the polar armature 71 has been shifted to its right-hand position due to the energizing of relay IWR with current of reverse polarity the relay NWR is provided with a stick circuit branching from the wire 74 along wire 76, front contact 77, winding of relay NWR to the terminal C. In the event the polar armature 71 of relay IWR occupies its reverse position due to the fact that the relay IWR was last energized with current of reverse polarity, to move the switch to its reverse position, the energizing of the despatcher controlled relays LGR and RGR to close the front contacts 72 and 73 completes a pick-up circuit for the relay RWR. This circuit extends from terminal B through front contacts 72 and 73, wire 74, the right-hand contact of polar armature 71, back contact 79 of relay NWR, and winding of relay RWR to terminal C. Relay RWR is provided with a stick circuit that branches around the polar armature 71 and the back contact 79 and which includes its own front contact 80 to retain this relay energized during the interval the relays LGR and RGR remain picked up after the polar armature 71 has been shifted to the left due to the supplying of current of reverse polarity to the relay IWR. It is to be seen, therefore, that when relay IWR is left deenergized with its polar armatures occupying the normal position indicating that the switch is in its normal position, the energizing of the two despatcher controlled relays LGR and RGR selects the relay NWR to apply current of reverse polarity to relay IWR to bring about the reversing of the switch. The relay NWR once selected, it is then held energized as long as the relays LGR and RGR are picked up in response to a control impulse from the despatcher's office to prevent the selecting of the opposing relay RWR after the relay IWR has been reversed. When the relay IWR is left deenergized with its polar armatures in the reverse position indicating that the switch is in the reverse position, the energizing of the two despatcher controlled relays LGR and RGR selects the relay RWR to supply current of normal polarity to the relay IWR to bring about the movement of the switch to its normal position. Relay RWR once selected it is held energized by a stick circuit to prevent the selecting of the relay NWR after the polar armatures of relay IWR have been shifted to the normal position.

To sum up the control of the switch SW, the switch controlling relay IWR is normally deenergized with its polar armatures occupying the position corresponding to the position of the switch. That is to say, with the switch normal, the relay IWR is deenergized with its polar armatures normal and with the switch reverse the polar armature of relay IWR are in the reverse position, and in addition, the winding of the relay IWR is normally short-circuited. With relay IWR in its normal position the energizing of the two despatcher controlled relays LGR and RGR selects the relay NWR which, as it becomes energized opens the short circuit, deenergizes relay KR and applies to the relay IWR current of reverse polarity to bring about the reversing of the switch. When the switch is in the full reverse position, the switch indication relay KR is again picked up closing the short circuit of relay IWR and thereby causing the relay IWR to be slowly released. With relay IWR in its reverse position, the selecting of the two despatcher controlled relays selects the relay RWR which as it becomes energized opens the short circuit, deenergizes relay KR, and applies current of normal polarity to the relay IWR to bring about the moving of the switch to its normal position. As the switch reaches its full normal position, the KR relay is again picked up closing the short circuit and slowly releasing the IWR relay. Whichever relay RWR or NWR is first selected, that relay remains energized during the entire interval that the despatcher controlled relays are energized which interval, as will appear later, is ordinarily much shorter than the time required for a movement of the switch.

Having described in detail the local control circuits for the operation of the switch SW, I will next take up the local control circuits for the H signal controlling relays. Assuming the switch SW to be in its normal position and referring to the signal controlling relay RAH for the eastbound signal RA, this relay is provided with a circuit that can be traced from the positive terminal B of the current source through the check contact 81 and back contact 82 of the time element relay TE, front contact 83 of relay TSP, front contact 84 of relay KR, normal contact of polar armature 85 of relay IWR, normal contact of polar armature 86 of relay KR, back contact 87 of the despatcher controlled relay LGR, front contact 88 of the westbound approach relay LAR, winding of relay RAH, front contact 89 of the despatcher controlled relay RGR to the terminal C. It follows that with the apparatus in the position shown in the figures, the above-traced circuit for the relay RAH can be closed by the energizing of the despatcher controlled relay RGR. The circuit network for the signal controlling relay LAH for the opposing westbound signal LA is the same as that just traced for the relay RAH up to the polar armature 86 of relay KR thence it extends along the wire 90, front contact 91 of the despatcher controlled relay LGR, front contact 92 of the eastbound approach relay RAR, winding of relay LAH, back contact 93 of relay RGR, to the terminal C. As this circuit is normally completed except at the front contact 91 of the despatcher controlled relay LGR, it follows that relay LAH will be energized and signal LA cleared by the energizing of the despatcher controlled relay LGR. Recalling that when the switch SW is in the reverse position, the polar armatures of the relay IWR occupy the reverse position and that the relay KR is energized in its reverse position, the signal controlling relay RBH for the westbound signal RB is provided with a circuit network that extends from the terminal B of the current source over the same circuit previously described up to the polar armature 85 of relay IWR thence by the reverse contact of polar armature 85, reverse contact of polar armature 94 of relay KR, back contact 95 of relay LGR, front contact 96 of relay LAR, winding of relay RBH, front contact 97 of relay RGR to the terminal C. That is to say, when the switch SW is set for traffic to the siding PS, the relay RBH will be energized to clear the signal RB by the picking up of the despatcher controlled relay RGR. Again, with the switch SW in its reverse position, the signal controlling relay LBH for the westbound signal LB is provided with a circuit network that extends from the terminal B, the same as just described up to the polar armature 94 of relay KR, thence over wire 98, front contact 99 of relay LGR, front contact 100 of the approach locking relay RMR, winding of relay LBH, back contact 101 of relay RGR to the terminal C. That is to say, with the switch set for the siding, the energizing of the despatcher controlled relay LGR to close its front contact 99 completes a circuit to the relay LBH for clearing the signal LB.

It will be noted that the signal controlling relay RDH for the distant signal RD is governed by a circuit easily traced that includes the front contact 102 of the signal controlling relay RAH for the signal RA. In like manner the circuit for the relay LDH that governs the distant signal LD is controlled by a simple circuit that includes the front contact 103 of the relay LAH for the signal LA. In any event to retain a signal controlling relay energized to clear its associated signal requires that the governing despatcher controlled relay be maintained continuously energized. For example, to retain relay RAH energized to clear the signal RA requires that the despatcher controlled relay RGR be held continuously energized, and as will appear later, this latter condition requires that energy be continuously transmitted from the despatcher's office.

From the foregoing description of the local control circuits for the switch SW and for the signals associated therewith it is seen that the switch operates from any position it may happen to be, to an opposite position by the energizing of the two despatcher controlled relays simultaneously for a brief interval of time, but to retain a signal in the clear position requires the continuous energizing of an associated despatcher controlled relay.

Referring now to Figs. 2ª and 2ᵇ and more especially to Fig. 1, I provide a communication channel which includes a pair of line wires designated by the reference characters L and Com between the office station and the field station. It will be understood that in practicing my invention a single office station in charge of a despatcher will most likely have jurisdiction over several field stations located along the railway and the line wire Com will act as a common return wire for all stations. In this form of apparatus of my invention a source of alternating current is provided at both the office station and the field station. As shown in Fig. 1 both the office station and the field station are normally supplied with current by a line transformer T each of which has its primary winding 104 permanently connected to the transmission wires 105 and 106 supplied with alternating current from a generator 107. The CX terminal of the secondary 108 of each of the line transformers is directly connected to the common return wire Com. The BX terminals of the secondaries 108 are connected to the line wire L through the apparatus at its location as will appear as the specification progresses. Considering a given instant the terminal BX of each transformer will be positive and the CX terminal negative and then upon the next instant the BX terminals will be negative and the CX terminals positive.

The office station is provided with a manually operated signal controlling lever LV and a manually operated switch controlling push button PB. The lever LV is capable of being moved to any one of three resting positions designated by the reference characters n, l, r, and operates a series of circuit controllers R1, L1, BD, R2 and L2 (see Fig. 2ª). The bridging piece 109 of controller BD engages both the contact springs 110 and 111 when the lever LV is in its n position and is rotated out of contact with these springs when the lever is moved to either its r or l position. The bridging piece 112 of controller L¹ spans both the contact springs 113 and 114 when the lever LV is moved to its l position only, and the bridging piece 115 of controller R1 spans contact springs 116 and 117 when the lever LV occupies its r position only. In a similar manner connection is made between the springs 155 and 156 of controller R2 by bridging piece 274 when the lever LV to its r position, and connection is made between the springs 153 and 154 of controller L2 by bridging piece 275 when the lever LV is moved to its l position.

Associated with the push button PB is a slow release relay PBR. The push button PB is of the spring return type and in its normal position engages a front contact 118 where it completes a short circuit for the winding of relay PBR as will be readily understood by an inspection of Fig. 1. When the push button PB is depressed to engage the back contact 119 the short circuit to the winding of relay PBR is removed and that relay supplied with current from the positive terminal B of a convenient source through back contacts 160 and 161 (see Fig. 2ª) of control relays LKP and RKP, respectively, to be described later, contact 110—111 of controller BD, contact 119, winding of relay PBR, resistance 120 and to the opposite terminal C of the same source of current. As long as the relay PBR is energized and closes its front contact 123, the BX terminal of the secondary 108 is connected to the line wire L and thus it follows that the full wave of the alternating current supplied by the transformer T at the office station is applied to the communication circuit. At the field station there is provided (see Fig. 1) two despatcher controlled relays LGR and RGR each having one terminal of its winding connected directly to the line wire L. The other terminal of the winding of relay LGR is connected to the line wire Com through a half wave rectifier 128 which is so positioned in the circuit that it freely passes current flowing from the common line wire toward the relay and substantially prevents the flow of current in the opposite direction. The other terminal of relay RGR is connected to the line wire Com through a half wave rectifier 129 which is so positioned in the circuit that it freely passes current flowing from the relay towards the common return wire and substantially prevents the flow of current in the opposite direction. While these rectifiers as well as all other rectifiers employed in my system may be any one of many types, a preferred type is that disclosed and claimed in the United States Letters Patents No. 1,640,335, granted to L. O. Grondahl, Aug. 23, 1927. It follows, that the full wave alternating current applied to the line wires L and Com at the office station during the period the relay PBR is energized will cause both relays LGR and RGR at the field station to become energized, one of the half wave pulses of the alternating current flowing through the loop circuit including the relay LGR and rectifier 128 and the other half wave pulses of the alternating current flowing through the loop circuit including the relay RGR and rectifier 129. As will appear hereinafter, the simultaneous energizing of these two control relays LGR and RGR is utilized for governing the operation of a railway switch.

In order to clarify the description I shall at times speak of current flowing in the line wire L from the office station towards the field station as current of positive polarity, and current flowing in the opposite direction in the line wire L, that is, from the field station towards the office station as current of negative polarity. Thus, the momentary depressing of the push button PB picks up relay PBR and pulses of current alternately of positive and negative polarity are supplied to the communication circuit during the release period of the relay PBR for simultaneously controlling the relays LGR and RGR.

The BX terminal of the secondary 108 at the office station is connected to the contact spring 117 of controller RI through a half wave rectifier 121 and to the contact spring 113 of controller LI through a half wave rectifier 122. The rectifier 121 is so positioned in the circuit that it readily passes current flowing from the BX terminal toward the spring 117 while substantially preventing the flow of current in the reverse direction. As the spring 116 of controller RI is connected directly to the line wire L, it is clear that when the lever LV is moved to its $r$ position and the contact 116—117 closed, pulses of current of positive polarity are supplied to the communication circuit which flows out the line wire L through relay RGR, rectifier 129 and back over the common return wire Com. At the office station there are provided two control relays LKP and RKP each having one terminal of its winding connected directly to the common return wire Com. The other terminal of the winding of relay LKP is connected through a half wave rectifier 126 and the back contact 125 of relay PBR to the line wire L. The rectifier 126 is so positioned that it freely passes current flowing only from the line wire L toward the relay LKP. The other terminal of the winding of relay RKP is connected to the line wire L through a half wave rectifier 127 which is so positioned as to freely pass current flowing only from the relay toward the line wire L. Thus when lever LV is moved to its $r$ position and half wave pulses of current to positive polarity are supplied to the line circuit as stated above for energizing the relay RGR at the field station, positive half wave pulses of current will also pass through the rectifier 126 to energize the relay LKP. Rectifier 122 is so connected in the circuit as to pass current flowing from the spring 113 toward the BX terminal of the secondary 108, that is, in a direction reverse to that of rectifier 121. As the spring 114 of controller LI is connected directly to the line wire L, it follows that half wave pulses of current of negative polarity will flow out the common return wire Com, through rectifier 128, relay LGR and back over the line wire L when the lever LV is moved to its $l$ position and that negative half pulses of current will also flow through the relay RKP and the rectifier 127 to energize that relay. Thus, when the lever LV is moved to its $r$ position, pulses of current of positive polarity are supplied to the communication circuit and the relay LKP of the office station and the relay RGR of the field station are both energized. When half wave pulses of current of negative polarity are supplied to the communication circuit in response to the lever LV being moved to the $l$ position, the relay RKP at the office station and the relay LGR at the field station are both energized. That is to say, the operation of the push button PB causes a full wave alternating current to be applied to the communication circuit which current circulates through the two loop circuits at the field station to energize the relays LGR and RGR simultaneously. The two control relays LKP and RKP at the office station remain deenergized at this time due to their circuit being held open at the back contact 125 of the relay PBR. Operating the signal lever LV to either its $l$ or $r$ position causes half wave pulses of alternating current to be applied to the communication circuit which circulates through the corresponding loop circuits of the field and office stations in parallel. As shown in Figs. 2$^a$ and 2$^b$, half wave rectifiers 192 and 193 may be connected across the terminals of the relays RKP and LKP, respectively, and the half wave rectifiers 191 and 194 may be connected across the terminals of the relays LGR and RGR, respectively, causing these relays to be operated on a much lower voltage and causing them to be somewhat slow releasing in character.

As stated at the outset of this description, the indicating of the condition of the apparatus at the field station is accomplished over the same communication circuit as is used to transmit the control energy from the office station to the field station. As shown more clearly in Fig. 1 the secondary 108 of the transformer T at the field station has its CX terminal connected to the common return wire directly and its BX terminal connected to the line wire L through either one or the other of two half wave rectifiers 130 and 131, a polar armature 189 of the indication relay KR, and a series of circuit networks indicated only in Fig. 1 but to be described in detail in connection with Fig. 2$^b$. As will appear when the operation of the system is described, the relay KR together with the circuit networks indicated in Fig. 1 are so governed that the supply of indication current from the field transformer T to the communication circuit is such that, at such time as when the control current flows from the office station out over the line wire L and back over the common return wire, the indication current is made to flow from the field station toward the office station over the common return wire and return over the line wire L. At such time as the control current flows out over the common return wire and returns over the line wire L to the office station the indication current is made to flow from the field station over the line wire L and return over the common line wire. In other words, the two remotely located stations of Fig. 1 are connected by a single control circuit provided with a pair of loop circuits at each station each of which is adapted to pass current in one direction only. Each station is supplied with alternating current from a common source from which current is made at times to flow from each station in the control circuit in the same direction at time spaced intervals equal to one-half cycle of the alternating current, whereby a loop circuit at each station is energized by the current supplied at the opposite station.

Referring now to Fig. 2a there is provided at the office station a normal switch indication lamp 132 and a reverse switch indication lamp 133 which are associated with a normal switch indication relay NWE and a reverse switch indication relay RWE, respectively. The normal indication relay NWE is shown held energized by virtue of a stick circuit extending from the B terminal of the source of current, back contact 134 of relay PBR, front contact 135 of relay NWE, back contact 136 of relay RWE, winding of relay NWE to the terminal C of the current source. The indication lamp 132 being connected in parallel with the winding of relay NWE, this lamp is displayed whenever the relay is energized. While relay NWE is retained energized by its stick circuit, it can be picked up only when the control relay LKP is energized to close its front contact 137 which is in parallel with the front contact 135 of relay NWE. The reverse switch indication relay RWE is provided with a pick-up circuit that includes the terminal B, back contact 134, front contact 138 of the control relay RKP, back contact 139 of relay NWE, winding of relay RWE to the terminal C, while the indication lamp 133 is connected in parallel with its winding. The stick circuit for relay RWE includes its own front contact 140 in parallel with the front contact 138 of control relay RKP. In addition to the relays NWE and RWE governing the switch indication lamps, they also govern at their front contacts 141 and 142, respectively, the connection between the BX terminal of the secondary 108 and the rectifiers 121 and 122. It follows that either one or the other of these switch indication relays must be energized before a signal controlling circuit can be completed to supply a signal controlling current to the communication channel.

Associated with the signal controlling lever LV are three signal indication lamps, normal lamp 143, L signal lamp 144 and R signal lamp 145, together with a polar relay HKP. As long as both of the controlling relays LKP and RKP remain deenergized, the normal signal indication lamp 143 is supplied with current from the terminal B through the back contact 149 of relay RKP, wire 150, lamp 143, wire 151, back contact 152 of relay LKP to the terminal C. Normally the relay HKP has one terminal of its winding connected to terminal C through the back contact 146 of control relay LKP and its opposite terminal also connected to the C terminal through the back contact 147 of the control relay RKP. Whenever relay LKP becomes energized in a manner to later appear to close its front contact 146, current is supplied to the winding of relay HKP which flows through the winding in a direction to shift the polar armature 148 of that relay to its right-hand position, that is, to the position opposite to that shown in Fig. 2a. The picking up of the control relay RKP to close the front contact 147 supplies current to the winding of relay HKP that flows in the winding of that relay in a direction to shift the polar armature 148 to its left-hand position, that is, to the position shown in Fig. 2a. Whenever lever LV is moved to its l position to supply half-wave pulses of negative polarity to the control circuit and to the local loop circuit, the relay RKP is energized, the circuit to the normal signal lamp 143 is opened to extinguish that lamp, and the relay HKP is shifted to its left-hand position. Under this condition of the office station equipment the subsequent energizing of the control relay LKP completes a circuit from the B terminal through front contact 149 of relay RKP, left-hand contact of polar armature 148 of relay HKP, lamp 144, contact 153—154 of controller L2, front contact 152 of relay LKP to the terminal C with the result that the L signal indication lamp 144 will be illuminated. Placing the lever LV at its r position so that half-wave pulses of positive polarity are supplied to the control circuit and to the local loop circuit, the control relay LKP is energized which will extinguish the normal signal lamp 143 and shift the relay HKP to its right-hand position. Under this condition of the office apparatus the subsequent energizing of the control relay RKP closes the circuit from terminal B through the front contact 149 of relay RKP, right-hand contact of polar armature 148, lamp 145, contact 155—156 of controller R2, and the front contact 152 of relay LKP to the terminal C with the result that the R signal indication lamp 145 will be illuminated. It is to be seen, therefore, that with the lever LV in its normal position and both control relays LKP and RKP down, the normal signal indication lamp 143 is displayed. The shifting of lever LV to its l position extinguishes lamp 143 and after there is the sequence of events of moving lever LV to its l position, energizing the control relay RKP, shifting of polar relay HKP to its left-hand position and the subsequent energizing of the control relay LKP; the L signal indication lamp 144 is displayed. When the sequence of events is lever LV moved to its r position, control relay LKP picked up, relay HKP shifted to its right-hand position, and the subsequent picking up of the control relay RKP, the R signal indication lamp 145 is displayed.

The line wire L is normally disconnected from the office equipment at the front contact 157 of a relay LP. Relay LP is energized by either one of two circuits. One circuit includes terminal B, back contacts 158 and 159 of relays NWE and RWE, respectively, winding of relay LP to the terminal C. The second circuit can be traced from the terminal B through front contact 160 of the control relay LKP to the winding of relay LP and thence to terminal C, or by the back contact 160 of relay LKP and the front contact 161 of relay RKP and as before traced. It follows that whenever the push button PB is depressed to bring about the deenergizing of both the switch indication relays NWE and RWE, or when the signal lever LV is operated to either its l or r position to bring about the energizing of one of the control relays RKP or LKP, the relay LP is immediately picked up to close the connection to the line wire L.

Although it was stated earlier in the specification that in this form of apparatus of my invention alternating current is supplied from a common source to both the office and the field stations, it is to be understood that I do not wish to limit myself to alternating current supplied by a single source. My invention is equally adapted to alternating current supplied to the office station and to the field station from separate and independent sources should it seem desirable to do so. In Figs. 2ª and 2ᵇ, there is provided standby equipment at both the office station and at the field station that automatically makes available a local source of alternating current in the event of a failure of the normal supply of power. As this standby equipment is the same at both locations, except for difference in frequency, it is thought that a description of one will suffice for an understanding of both. Referring to Fig. 2ª, the power-off relay POR has its winding permanently connected across the terminals of the secondary 108 and is thus normally energized. The connection from the BX terminal of the secondary 108 to the office equipment includes the front contact 162 of the power-off relay POR. A mechanically tuned alternator TA is normally inactive but in the event there is a failure of the transformer T to supply current, the relay POR is deenergized to open the connection from the secondary 108 to the office equipment and to render the tuned alternator active by the closing of its energizing circuit. This energizing circuit includes the terminal B of a suitable source of current such as a storage battery not shown, back contact 163 of relay POR, back contact of its own armature 164, winding of the tuned alternator TA to the C terminal of the same source of current. As long as this circuit for the tuned alternator TA remains closed at contact 163, it is apparent that the armatures 164 and 165 will be oscillated at some predetermined frequency as determined by their weight and by a biasing element customarily employed in such apparatus. When armature 165 engages its front contact, current is supplied to the left-hand half of the primary winding 166 of a transformer TI and when armature 165 engages its back contact, current is supplied to the right-hand half of the winding 166. This alternate energizing of the two halves of the winding 166 induces an alternating current in the secondary winding 167 of the transformer TI. Secondary 167 has one terminal connected permanently to the common return wire and its other terminal to the back contact 162 of the power-off relay POR. It follows, that failure of the normal source of current deenergizes relay POR to render the standby tuned alternator TA active and to complete a connection for supplying the office equipment with current from the secondary 167 of transformer TI. The tuned alternator TA may be any one of several types well known in the art. A condenser 168 may be connected across the winding of alternator TA and a condenser 169 connected across the primary winding 166.

While the tuned alternator TAI at the field station is preferably of the same type as the tuned alternator TA and is controlled in a like manner to supply current to the field station equipment in the event of a failure of the transformer T at that location, I have found it to be desirable to have the two alternators deliver current of different frequencies and also at a frequency different from the normal source of supply. For example, if the frequency of the normal source of supply is sixty cycles per second, the frequency of the current supplied by TA and TAI may be one hundred forty and one hundred cycles per second, respectively. However, it will be understood that my invention is not confined to these frequencies but they are given by way of illustration only.

To provide the despatcher with information pertaining to the occupancy of the approach track sections I provide the office station with a track model TM on which are mounted a track indicating lamp 170 for reporting the traffic condition of the approach track sections to the left of the main track section IT and a lamp 171 for reporting the traffic condition of the approach track sections to the right of section IT. These lamps 170 and 171 are provided with simple circuits easily traced which are controlled by relays RAP and LAP, respectively. Normally both of these relays are deenergized and both lamps dark. A control circuit including a line wire L3 and the common return wire Com is provided for controlling the relays LAP and RAP by the field station equipment. To be explicit, the BX terminal of the secondary 108 at the field station is connected to the line wire L3 through a half-wave rectifier 172 and the back contact 173 of the eastbound approach relay RAR, or through the half-wave rectifier 174 and the back contact 20 of the westbound approach relay LAR or directly through the back contact 175 of the repeater relay TSP. Relays LAP and RAP each have one terminal of its winding connected directly to the common return wire. The opposite terminal of relay LAP is connected to the line L3 through the half-wave rectifier 176 and the other terminal of the relay RAP is connected to the line wire L3 through half-wave rectifier 177. That these relays may operate at a lower voltage and to make them slightly slow-releasing, a rectifier 178 is connected across the terminals of the relay LAP and a rectifier 179 across the terminals of relay RAP. The rectifiers 172 and 177 are so connected into the circuit that when the eastbound approach relay RAR is deenergized to close the back contact 173, half-wave pulses flow in the circuit to energize relay RAP and thus illuminate the track model lamp 170. In a similar manner the rectifiers 174 and 176 are so connected into the circuit that when the westbound approach relay LAR is deenergized to close the back contact 20, half-wave pulses flow in the line L3 to energize the relay LAP and thus illuminate the track lamp 171. When the track repeater relay TSP is deenergized in response to a train occupying the section IT and the back contact 175 is closed, full-wave alternating current is supplied to the line L3 and both relays LAP and RAP are picked up to illuminate both lamps of the track model. In addition to the visible indication provided by the lamps 170 and 171 it is evident that the relays LAP and RAP can be arranged to control audible indication devices should it be thought desirable to do so. Furthermore, in place of having the track model normally dark and a lamp displayed in response to an approach track section becoming occupied it can be arranged to be normally illuminated and become dark as the approach track sections are occupied.

In describing the operation of the apparatus shown in Figs. 2ª, 2ᵇ and 2ᶜ, I will assume the apparatus to be normally in the position shown in the figures and I will first consider the case where the despatcher desires to reverse the switch SW and clear the signal LB to admit a westbound train into the siding PS. The despatcher will first momentarily depress the push button PB to pick up the relay PBR. Relay PBR on being picked up opens the stick circuit to the normal switch indication relay NWE and to the lamp 132 to deenergize that relay and to extinguish the normal switch indication lamp. Relay PBR also opens at its back contact 125 the local loop circuits to the control relays LKP and RKP and closes at its front contact 123 the connection from the BX terminal of the secondary 108. Relay LP at once becomes energized, due to the fact that both relays NWE and RWE are now down, to close the connection to the line wire L and thus full-wave alternating current is supplied to the communication channel during the slow-release period of the relay PBR. That is to say, an impulse of alternating current of a given duration is applied to the communication channel as illustrated in the diagram a of Fig. 6, and this current impulse flows from the source at the office station. As a result of this impulse of full-wave alternating current being applied to the communication channel the despatcher controlled relays LGR and RGR of the field station are energized due to the fact that the traffic controlled circuit network is normally closed. To be explicit, this traffic controlled circuit net work can be traced from line wire L, through front contacts 180 and 181 of relays ITS and TSP, respectively, back contact 182 of the time element relay TE, back contact 183 of relay IWR, and thence through the back contacts 185 and 186 of relays RAH and RBH, respectively, winding of relay LGR, rectifier 128 and to the common return wire Com, and also by the back contacts 187 and 188 of the relays LAH and LBH, respectively, winding of relay RGR and rectifier 129 to the common return wire. The controlling current being a full-wave alternating current, the rectifier 128 passes one-half of the wave to energize relay LGR and the rectifier 129 passes the other half of the wave to energize the relay RGR. The energizing of both of the control relays LGR and RGR to simultaneously close both front contacts 72 and 73 completes the pick-up circuit for the relay NWR inasmuch as the switch controlling relay IWR is now in its normal position, and relay NWR now picks up to supply the relay IWR with current of reverse polarity as described in detail hereinbefore. Relay IWR will be retained energized in its reverse position by its stick circuit and the motor M rendered active to reverse the switch to its reverse position, even though the despatcher controlled relays LGR and RGR and control relay NWR all will become deenergized as soon as the controlling impulse from the office station terminates at the end of the release period of the relay PBR, it being understood, however, that the release period of relay PBR is of sufficient duration to operate relays LGR and RGR long enough that the relay NWR is picked up and relay IWR reversed. It is to be noted in connection with the circuit network for the relays LGR and RGR that the back contact 202 of relay KR will retain this network closed even after relay IWR has been energized to open its back contact 183.

When the switch is fully reversed, the switch indication relay KR is energized in its reverse position to close the short circuit to the winding of relay IWR causing that relay to be slowly released. During the interval that the front contact 183 of relay IWR remains closed after the switch indication relay KR is reversed the secondary 108 of the transformer T at the field station is connected to the line wire L, through the circuit network that includes rectifier 131 as previously referred to, to supply rectified current to the communication channel. The rectifier 131 permits current to flow only towards the BX terminal of the secondary 108 and thus the indication current supplied consists of half-wave pulses which flow from the CX terminal of the secondary 108 of the field transformer over the common line wire Com, wire 124, winding of relay RKP, rectifier 127, back contact 125, front contact 157, line wire L, front contacts 180 and 181, back contact 182, front contact 183 of relay IWR, front contact 190 and reverse polar contact 189 of relay KR and rectifier 131 to the BX terminal of secondary 108. With the control relay RKP of the office loop circuit energized by this indication current, current will be supplied to the reverse switch indication relay RWE and that relay once picked up will then be retained energized by its stick circuit and the reverse switch indication lamp 133 will be illuminated to indicate to the despatcher that the switch is in the reverse position. The pick-up circuit for the reverse switch indication relay RWE includes the back contact 134 of relay PBR, front contact 138 of relay RKP and the back contact 139 of the normal switch indication relay NWE as previously pointed out, while the stick circuit for relay RWE includes the back contact 134, its own front contact 140 and the back contact 139.

The switch having thus been operated to its reverse position and a reverse switch indication impulse returned to the office station to establish the reverse switch indication lamp 133, the despatcher next moves the lever LV to its l position to clear the signal LB. The reverse switch indication relay RWE being now picked up and the contact 113—114 closed the rectifier 122 permits half-wave pulses to be supplied from the office secondary 108 to the office loop circuit that includes the relay RKP and rectifier 127 to energize the control relay RKP. It is to be here noted that the reverse switch indication impulse transmitted from the field station terminated at the end of the release period of the relay IWR and the relays RKP and LP at the office station both became deenergized. This office loop circuit closed as the lever LV is moved to its l position can be traced from the CX terminal of office secondary 108, through wire 124, winding of relay RKP, rectifier 127, back contact 125, contact 113—114, rectifier 122, front contact 142 of relay RWE and front contact 162 of relay POR to the BX terminal of the secondary 108. With the energizing of relay RKP the circuit to the relay LP, that includes the front contact 161 of relay RKP, is closed and the connection to the line wire L is again completed so that the half-wave pulses now supplied at the office station will flow through the communication circuit and the corresponding loop circuit at the field station that includes the control relay LGR, inasmuch as the traffic controlled circuit network is also closed. This circuit for energizing the relay LGR can be traced from the CX terminal of the office secondary 108 over the common line wire Com, rectifier 128, winding of relay LGR, back contacts 186, 185, 183 and 182, and front contacts 181 and 180 of the traffic controlled circuit network, line wire L, front contact 157, contact 113—114, rectifier 122, and front contacts 142 and 162 to the BX terminal of the office secondary 108. Thus with the lever LV moved to its l position current is continuously supplied from the office transformer T to retain the control relay RKP at the office station and the control relay LGR at the field station steadily energized in parallel. The polar armatures of the switch controlling relay IWR being now in the reverse position and the switch indication relay KR being now energized in its reverse position the closing of the front contact 99 of the control relay LGR completes the circuit to the signal controlling relay LBH and that relay is picked up to clear the westbound signal LB.

The energizing of the signal controlling relay LBH not only clears the signal LB but it also closes the circuit for the indication current from the secondary 108 of the field transformer T that includes the rectifier 130. The circuit for this return indication current extends from the BX terminal of the field secondary 108 through rectifier 130, front contact 188 of relay LBH, back contacts 187, 183 and 182 and front contacts 181 and 180 of the circuit network, line wire L, front contact 157, back contact 125, rectifier 126, winding of control relay LKP, wire 124 and common line wire Com to the CX terminal of the field secondary 108. It will be recalled that the moving of the lever LV to its l position and the picking up of the relay RKP causes the polar relay HKP to be shifted to its left-hand position, and thus the sequence of moving the lever LV to its l position, energizing the control relay RKP, shifting relay HKP to its left-hand position and the subsequent energizing of the relay LKP completes the circuit to the L signal indication lamp 144 and that lamp will now be energized to indicate to the despatcher the clear position of the signal LB. Therefore, the despatcher now has before him a steady display of the reverse switch indication lamp 133 to indicate the reverse position of the switch SW and the continuous display of the signal indication lamp 144 to indicate the clear position of the westbound signal LB. It should be noted that the energizing of the signal controlling relay LBH opens at its back contact 188 the connection to the control relay RGR and thus the half-wave pulses supplied by the field equipment for indication purposes are prevented from operating the control relay RGR.

With the apparatus in the condition just described, the transformer T at the office station continuously supplies through the rectifier 122 a control current consisting of half-wave pulses of the alternating current which retain the relay RKP at the office station energized and which flow over the common return wire through the rectifier 123 and the relay LGR and back over the line wire L to select the signal controlling relay LBH for clearing the signal LB. The fact that the relay LBH is picked up permits an indication current, which consists of half-wave pulses, to flow from the field transformer T through rectifier 130 towards the office station over the line wire L through rectifier 126 and relay LKP at the office station and back to the field station over the common line wire.

The current in the communication channel is now a control current consisting of half-wave pulses of alternating current as illustrated by the shady portion of diagram d of Fig. 6 and an indication current which consists of half-wave pulses of alternating current as illustrated by the unshaded portion of diagram d of Fig. 6. The control current and the indication current both flow in the two line wires Com and L in the same direction and are time-spaced apart a half cycle of the alternating current inasmuch as they are the opposite half waves of the alternating current supplied from the transmission line. Since this condition involves proper polarities of transformer connections the condition of the equipment is illustrated in Fig. 1. When the instantaneous polarity of the secondary 108 of the office transformer T is as marked by the plus and minus signs, the instantaneous polarity of the secondary 108 of the field transformer T is as shown by the plus and minus signs. Consequently, any tendency of the current flowing from the positive terminal of the field transformer through rectifier 130, circuit network, line wire L, controller LI, rectifier 122 and the secondary 108 of the office transformer is opposed by the voltage of the secondary of the office transformer. It follows that there exists no flow of short circuit current of one secondary through the winding of the secondary of the other transformer. While this synchronization is advantageous, it will be understood that it is not essential. As previously stated, when the standby tuned alternators are active, I have found it to be preferable to have them different in frequency and also each different from the frequency of the normal source of current. In the cases of sources of two different frequencies the condition resulting during a signal operation would be that, the half-wave pulses applied to the line circuit from the office source of energy to energize the control relay at the field station, and the half-wave pulses applied by the field source of energy for indication would not be in synchronism and there would, therefore, be a tendency for a short circuit of the two sources. The actual condition in the line circuit at this time, if proper resistances, such as resistances R10 of Figs. 2ª and 2ᵇ are inserted in the circuit to prevent any short circuit current of damaging magnitude, would be current of irregular wave shape due to the combination of the two frequencies. As stated above, I have found from tests that the apparatus works satisfactorily if frequencies be so selected that the difference between the two frequencies is greater than the frequency of pulses on which the operating relays would drop out.

I will now consider that a train approaches the switch from the right shunting first the track relay A4TR and then the track relay 4TR of the approach track sections A4T and 4T, respectively. The shunting of relay A4TR drops the approach relay LAR to close the back contact 20 in the approach indication circuit causing the energizing of the office relay LAP and the subsequent lighting up of the approach indication lamp 171 on the track model. When the signal controlling relay LBH was picked up to clear the signal LB, the stick circuit for the approach locking relay LMR was opened at the back contact 36 and that relay deenergized. The dropping of the approach relay LAR by the westbound train entering the section A4T opens the pick-up circuit for the relay LMR at the front contact 38 and the usual approach locking protection against the possibility of a switch operation is provided.

When the westbound train arrives at the main track section IT, the track relay ITS is shunted, deenergizing in turn the repeater relay TSP. Dropping the relay ITS from its front to its back contacts causes a momentary interruption of the line circuit at the contact 180 but this interruption is of insufficient duration to drop either the control relay LGR or LKP since both of these relays are snubbed by rectifiers. When relay TSP drops at the end of its slow-release period, the circuit to the signal controlling relay LBH is opened at the front contact 83 and that relay is deenergized. Deenergizing the relay LBH sets the signal LB at stop and removes the supply of indication energy from the line circuit by opening the front contact 188 and thus the office control relay LKP drops extinguishing the L signal indication lamp 144 giving the despatcher an indication of the time the westbound train arrives at the main track section IT and also that the signal LB has been returned to its stop position. The deenergizing of relay TSP also closes at its back contact 175 a direct connection between the secondary 108 and the approach indication line wire L3 so that both relays LAP and RAP are picked up and both lamps 170 and 171 on the track model displayed. Thus the OS indication of the presence of a train on the main track section IT is accomplished by both the extinguishing of the L signal indication lamp 144 and the illumination of the second lamp 170 on the track model.

If the operator returns the lever LV to its n position immediately following the extinguishing of the lamp 144, the control energy is discontinued and both the office relay RKP and the field relay LGR are deenergized. Both the control relays LKP and RKP being now down, the normal signal indication lamp 143 is again displayed. As soon as the train advances far enough into the siding to clear the approach track sections, the approach relay LAR is reenergized and the approach locking relay LMR picked up to release the approach locking in the usual manner. After the train has moved into the siding to clear the main track section IT, the track relay ITS is picked up as its pick-up circuit is now closed at the back contacts 4 and 5 of relays LGR and RGR, respectively, and in turn the repeater relay TSP is picked up at the end of its pick-up period. As soon as the relay TSP functions to open the back contact 175 in the approach indication circuit both relays LAP and RAP become deenergized and both lamps on the track model are extinguished. We now have the field equipment back in its normal position with all signals at stop and the switch reversed, while at the office the reverse switch indication lamp 133 and the normal signal indication lamp 143 are displayed indicating to the despatcher this condition of the switch and signals.

It is to be pointed out that the slow-release characteristics of relay TSP prevent a momentary shunting of the track section IT, while the westbound train occupies one of the approach sections, from releasing the approach locking relay LMR in the event an opposing track section 5T or A5T be occupied at the time. The slow pick-up feature of the relay TSP prevents a momentary loss of shunt of the track section IT, as might occur in the case of high speed motor cars, from completing the circuit network for the switch controlling relay IWR. Also, it is to be noted, that contact 29ª permits relay LMR to pick up as this westbound train moves into the siding.

In the event the operator, instead of immediately returning the lever LV to its n position after the train arrives at the track section IT, leaves it remaining in its l position, the track relay ITS could not be picked up after the train has passed into the siding and cleared the section IT due to the fact that its pick-up circuit is held open at the back contact 4 of the control relay LGR as the control energy from the office continues to hold relay LGR up. With track relay ITS remaining down, the repeater relay TSP remains deenergized and the front contact 83 in a circuit network to the signal controlling relay LBH is held open to prevent the signal LB from again being cleared as soon as the train passes off the section IT. That is to say, there is provided a stick feature for the signal LB that requires the operator to first restore the lever LV to its normal n position before the signal can be cleared for any following train. In connection with the retaining of the control relay LGR energized in the event the operator leaves the lever LV at its l position after the westbound train has entered the section IT, it is to be pointed out that the circuit network for this controlling relay is at this time completed at the back contact 180 of relay ITS.

Let us next consider the possibility of the operator depressing the push button PB to restore the switch to its normal position immediately after he has replaced the lever LV in its n position and before the train has vacated the main track section IT. The relay PBR is picked up and full wave alternating current supplied to the communication channel during its slow-release period in the usual manner. While this alternating current will energize both the control relays LGR and RGR at the field station and in turn pick up the relay RWR, the switch controlling relay IWR is prevented from operating due to the holding open of the front contacts 50 and 51 of relays ITS and TSP, respectively. At the end of the impulse of alternating current relays LGR and RGR together with the relay RWR all become deenergized and thus no function is performed by the field equipment. At the office the depressing of the push botton PB and the picking up of the relay PBR opens the stick circuit for the relay RWE and that relay is deenergized and the reverse switch indication lamp 133 extinguished, leaving the operator without any switch indication. Both relays NWE and RWE now being down, the relay LP is held up holding closed the connection to the line circuit at its front contact 157. As soon as the train vacates the section IT and relay ITS picks up, a reverse switch indication impulse is supplied by the field equipment during the pick-up period of the relay TSP and the reverse switch indication relay RWE is reenergized and the lamp 133 is reestablished to again indicate to the despatcher the reverse position of the switch. Referring to Fig. 2b, when the train vacates the section IT and relay ITS is energized but before relay TSP closes its front contact due to its slow pick-up characteristics, the secondary 108 of the field transformer supplies half-wave pulses which flow from the CX terminal over the common return wire Com, winding of relay RKP, rectifier 127, back contact 125, front contact 157, line wire L, front contact 180 of relay ITS, back contact 181 of relay TSP, front contact 190 and reverse contact 189 of relay KR, rectifier 131 and to the BX terminal of secondary 108. The energizing of the office relay RKP during the period that this reverse indication impulse persists permits the relay RWE to be picked up and then retained energized by its stick circuit to reestablish the reverse switch indication lamp 133. While there will occur a blinking of the normal signal indication lamp 143 during the interval that the relay RKP is energized in the reestablishing of the reverse switch indication, that lamp is immediately again displayed as soon as the relay RKP drops at the end of the indication impulse. It follows that although the despatcher has attempted to make a premature movement of the switch, no operation takes place at the field station and he is again provided with proper indications as soon as the track section IT is cleared.

In the event the despatcher restores lever LV to position n and depresses the push button PB while the westbound train occupies one of the approach track sections and before it has reached the section IT, the switch controlling relay IWR is prevented from responding to the energizing of the control relays LGR and RGR due to its circuit being held open at the front contact 49 of the approach locking relay LMR. The operator can regain control of the switch while the train occupies an approach track section by setting the signal LB at stop, which he can do by moving lever LV back to its n position, and discontinue the supply of energy to the relay LGR, and then operating the push button PB. As lever LV is moved to its n position and relays RKP and LGR deenergized, the L signal indication lamp 144 is immediately extinguished, however, the normal signal indication lamp 143 will not light up until the signal controlling relay LBH has actually become deenergized to set the signal LB at stop due to the fact that the field apparatus will continue to supply indication energy to the communication channel as long as relay LBH holds closed its front contacts. In actual practice the signal controlling relays may be made slow-releasing, especially in absolute permissive block signaling systems, so there would be a considerable delay in the signal actually assuming its stop position after the signal lever LV was returned to its n position. The display of the normal signal indication lamp 143 is thus an indication to the operator that the signal has actually assumed the stop position. The taking away of the signal LB from the westbound train starts the time element relay TE by virtue of the fact that the relay MP is picked up when the back contact 36 of relay LBH closes. The operator in regaining control of the switch will depress the push button PB immediately after he has restored lever LV to the n position. While this operation of the push button PB causes the relays LGR and RGR to be operated, it accomplishes nothing in the control of the relay IWR as the circuit for that relay is now held open at the front contact 49 of the approach locking relay LMR, but it does cause the reverse switch indication lamp 133 to be extinguished. When the time element device TE has functioned to release the approach locking, the fact is indicated to the operator by the reestablishing of the reverse switch indication lamp 133 in the following manner, providing, of course, the train has stopped short of the track section IT. At the expiration of the release period of the approach locking as determined by the time element relay TE, and after that relay has closed its front contacts, there will exist a switch indication circuit from the CX terminal of the field secondary 108 over the common return wire, through the office loop circuit and back over the line wire L, as previously traced, thence through the front contacts 180 and 181 of relays ITS and TSP, respectively, front contact 182 of time element relay TE, front contact 190 and reverse contact 189 of relay KR, rectifier 131 and to the BX terminal of the secondary 108. Thus during the interval that the relay TE holds its front contacts closed, a reverse switch indication impulse will be supplied to the office apparatus reestablishing the indication lamp 133 which will indicate to the operator that the time element device has functioned, the approach locking released and that he has regained control over the switch. The operator can now actuate the push button PB and bring about an operation of the switch SW in the usual manner.

I will next assume that the apparatus is in its normal position as shown in the figures and the despatcher wishes to advance an eastbound train out of the siding PS. The reversing of the switch SW will follow the operation of the push button PB in the manner already described. The operator will then move the lever LV to its r position closing the contact 116—117 of controller RI permitting thereby half-wave pulses to be supplied from the office secondary 108 through rectifier 121. These half-wave pulses pass from the BX terminal through contact 162, front contact 142 of relay RWE, rectifier 121, contact 116—117, back contact 125 of relay PBR, rectifier 126, and winding of the relay LKR to the CX terminal to energize that relay. As soon as the relay LP picks up to close the connection to the line wire L, the half-wave pulses are supplied over the line wire L, the traffic controlled circuit network, winding of the relay RGR, rectifier 129 and back to the CX terminal of the office secondary 108 over the common return wire. The energizing of the control relay RGR closes the front contact 97 in the circuit network for the signal controlling relay RBH and that relay is energized to clear the signal RB. When relay RBH picks up, it closes the front contact 186 in the circuit network of the signal indication circuit and half-wave pulses flow from the field secondary 108 over the common return wire, relay RKP, rectifier 127, back contact 125, front contact 157, line wire L, circuit network and rectifier 131 to the BX terminal of secondary 108. There is now present in the communication channel control half-wave pulses flowing from the office station to the field station, as illustrated by the shaded portion of diagram e of Fig. 6, and indication half-wave pulses flowing from the field station to the office station, as illustrated by the unshaded portion of diagram e of Fig. 6. As just pointed out, the control half-wave pulses effect the energizing of relay RGR to clear the signal RB, and as the sequence of moving lever LV to its r position, the energizing of relay LKP, and shifting of relay HKP to its right-hand position has selected the circuit for the lamp 145, the indication half-wave pulses by energizing the relay RKP cause the display of the R signal indication lamp 145. The picking up of the relay RBH opens at back contact 26 the stick circuit for the approach locking relay RMR causing the approach locking to function for the eastbound train in substantially the same manner that the approach locking functioned for the westbound train described above. The picking up of relay BH, also, opens at the back contact 186 the loop circuit to relay LGR preventing the indication current from energizing that relay.

As the eastbound train enters the section IT and brings about the deenergizing of relays ITS and TSP, the R signal indication lamp 145 is extinguished to give an OS indication to the operator. The deenergizing of relay TSP also causes alternating current to be applied to the approach indication circuit L3 and both lamps 170 and 171 of the track model become illuminated. The train upon vacating the section IT will permit the relay ITS to be reenergized over its pick-up circuit if the operator has in the meantime replaced the lever LV back to its n position to remove the control half-wave pulses from the communication channel. Should the operator fail to return the lever to its $n$ position, the relay RGR is retained energized by the circuit through the back contact 180 of relay ITS and relay ITS is prevented from being picked up when the train vacates the section IT. That is to say, signal RB will not again clear should the operator leave the lever in its $r$ position. As the relay ITS picks up and reenergizes the relay TSP, the alternating current is removed from the approach indication circuit and the lamp 170 of the track model extinguished, but the lamp 171 will still be displayed due to the fact that the approach relay LAR remains down as long as the eastbound train occupies an approach track section as it travels away from the switch.

It is to be noted that in the event the operator should move the lever LV to its $r$ position immediately after he has actuated the push button PB to reverse the switch and before the reverse movement is completed and the reverse switch indication received at the office, no action will take place for clearing a signal inasmuch as the closing of the contact 116—117 of controller RI is ineffective until the reverse indication relay RWE has been picked up and its front contact 142 is closed.

Again assuming the apparatus of Figs. 2$^a$, 2$^b$ and 2$^c$ to be in the normal position and that the despatcher desires to advance an eastbound train over the switch SW on the main track, he can do so as follows. Without operating the push button PB he will at once move the lever LV to its $r$ position causing thereby control half-wave pulses to be first applied to the office loop circuit to energize the relay LKP and then to the communication channel and field loop circuit to bring about the energizing of the field relay RGR. As the polar armatures of relay IWR now occupy the normal position and the relay KR is energized with current of normal polarity, the circuit for the signal controlling relay RAH is selected and signal RA cleared. The picking up of relay RAH closes the signal indication circuit at its front contact 185 and indication half-wave pulses are supplied to the communication channel by the field equipment through rectifier 131. As the sequence of moving lever LV to its $r$ position, energizing of relay LKP and shifting of relay HKP to its right-hand position has selected the circuit for lamp 145, the picking up of relay RKP by the indication half-wave pulses causes the display of the R signal indication lamp 145. As soon as an eastbound train enters the approach section A5T, the deenergizing of the approach relay RAR causes the lamp 170 on the track model to be displayed and acts to prevent the release of the approach locking except by means of the time element device TE. When the eastbound train has advanced into section IT, the relay RAH is deenergized by the opening of the front contact 83 of relay TSP and the signal RA set at stop and an OS indication given to the despatcher by the extinguishing of the R signal indication lamp 145. The deenergizing of relay TSP also brings about the display of the second lamp 171 on the track model in the same manner as previously pointed out.

The operation of the apparatus as the eastbound train on the main track advances through the track section IT and then travels away from the switch through the approach sections 4T and A4T will be similar to that already described for an eastbound train moving from the passing siding. It is to be pointed out, however, that should the operator actuate the push button PB attempting to operate the switch before the eastbound train on the main track vacates the section IT, the subsequent energizing of the control relays LGR and RGR is ineffective to bring about an operation of the switch controlling relay IWR as has already been pointed out. The depressing of the push button PB will, however, cause the deenergizing of the relay NWE and the extinguishing of the normal switch indication lamp 132. Under this condition, when the train vacates section IT a normal switch indication impulse will be applied to the communication channel during the pick-up interval of the repeater relay TSP after the track relay ITS has become energized. This normal switch indication impulse reestablishes the display of the lamp 132 indicating to the operator that the train has now passed off the track section IT and he can operate the switch in the usual manner.

The operation of the apparatus for a westbound train passing over the switch SW on the main track will be similar in all respects to that described in detail for an eastbound train and it is thought it needs no further description.

In moving the switch from one position to another, it often occurs the points meet an obstruction such as ice, snow or other foreign matter, preventing them taking the position intended. I will now assume that with the apparatus normal the operator actuates the push button PB to reverse the switch and the switch points meet some obstruction preventing the full reverse movement being made. The depressing of push button PB causes the extinguishing of the normal indication lamp 132 and the sending of a control impulse to energize both relays LGR and RGR and in turn select the relay NWR. After the switch points meet the obstruction, the motor M still attempts to move against the obstruction and at the end of a predetermined time interval the heating element 45 of the thermo-sensitive relay R$th$ becomes heated to a point where it operates the contact 46 opening the stick circuit for the relay IWR bringing about the deenergizing of that relay. The thermal relays R$th$ and N$th$ are of a type such that the usual operating current for ordinary operation of the switch will not cause the relay to operate. However, the overload resulting when the switch points are blocked will cause the relay to operate in an interval depending upon the overload and the adjustment of the relay. The opening of the front contact 54 of relay IWR removes current from the motor M and the operation of the switch is stopped, leaving the switch points at rest in mid position. The failure of reverse switch indication lamp 133 to be displayed in due time will indicate to the operator that there is a failure of the switch to make the movement intended. Assuming the operator has already moved the signal lever LV to either the $r$ or the $l$ position for clearing a signal as soon as the switch movement is completed, he will return the lever LV to its $n$ position and then again operate the push button PB. This second operation of PB repeats the function of transmitting a switch control impulse to the field station, but as relay IWR is now deenergized with its polar armatures in the reverse position, the picking up of the control relays LGR and RGR results in the selecting of the relay RWR and the supplying of current of normal polarity to the relay IWR. Relay IWR is now picked up in its normal position and the motor M actuated to return the switch to its normal position where a normal switch indication impulse is returned to the office station, reestablishing the normal indication lamp 132 indicating to the operator that the switch is now back in its normal position. The operator can now again depress the push button PB making a second attempt to reverse the switch against the obstruction. In case the obstruction is overcome and the switch is reversed the reverse switch indication lamp 133 will shortly be displayed in the usual manner. In case the obstruction is not overcome, the thermo relay R*th* again functions to open the stick circuit for relay IWR and stop the operation of the motor and after due time, the operator may again actuate the push button PB and return the switch to its normal position.

Taking the case where the operator actuates the push button PB to reverse the switch, and at once moves the lever LV to a position to clear a signal, and there is a failure of the movement of the switch and the operator depresses the push button a second time without restoring the lever LV to its *n* position; this unusual operation of the push button PB can result in no harm due to the fact that the circuit for the relay PBR is held open at the contact 110—111 of controller BD and, therefore, does not respond to the second operation of the push button.

Assuming that the operator after permitting the switch to move a short distance away from its normal position, again pushes the push button PB to return the switch to its normal position; in this case the picking up of the control relays LGR and RGR in response to the second control impulse selects the relay RWR to energize the relay IWR with current of normal polarity while that relay is still energized with current of reverse polarity. The energizing of relay RWR opens at its back contact 65 the stick circuit for relay IWR and the current of reverse polarity is removed while the closing of the front contact 15 of relay RWR closes the energizing circuit to apply current of normal polarity to the winding of relay IWR. Relay IWR will, therefore, be quickly deenergized and then reenergized with current of normal polarity and its polar armatures restored to their normal position causing the motor M to reverse the operation of the switch and move it back to its normal position. The operating of relay IWR by a second action of the push button after that relay has been once energized to move the switch from its reverse to normal position will be accomplished in a similar manner by the selecting of the relay NWR. Thus it follows that the operator can readily bring about a reversal of the operation of the switch at any point in its movement.

Another condition that might occur is that where the push button PB is held down an inordinately long time sufficient for a complete operation of the switch. As long as the push button PB is depressed, alternating current continues to be supplied to the communication channel to hold both control relays LGR and RGR simultaneously energized and in turn retains relay NWR or RWR as the case may be energized. Retaining either relay NWR or RWR energized prevents the switch indication relay KR from being picked up and prevents the switch controlling relay IWR from being deenergized although the motor may have completed the movement of the switch and its operating circuit opened at the contact 9. Consequently, the switch indication impulse is not supplied to the line circuit but is held stored by the relays KR and IWR until such time as the push button PB is actually released and the despatcher controlled relays deenergized.

In the event there occurs a failure of the transformer T at the field station the deenergizing of the power-off relay POR cuts in the energizing circuit for the tuned alternator TAI and switches the connection from the secondary 108 of transformer T to the secondary 167 of transformer TI and this secondary 167 then becomes the source of power for all indication impulses. In like manner a failure of the transformer T at the office station deenergizes its power-off relay and the tuned alternator TA is rendered active and the connection to the office equipment switched from the secondary 108 of its transformer T to the secondary 167 of its transformer TI and this secondary then becomes the source of power for all control impulses. Should there occur a complete failure of the normal source of current both tuned alternators are rendered active and each local standby source of current rendered effective.

In the form of apparatus disclosed in Figs. 2ª, 2ᵇ and 2ᶜ there is no provision for any storage of a switch control, that is, the operator must wait until the proper time for a switch operation to be made before he can initiate such a movement by the actuating of the push button PB. In Fig. 3 there is disclosed a modified form of the field apparatus wherein there is provided means that permit storing of a switch control impulse which will eventually cause the operation of the switch as soon as traffic conditions are such as to permit a switch operation.

The despatcher controlled relays LGR and RGR are operated by energy supplied through rectifiers 128 and 129, respectively, and over a traffic controlled circuit network the same as that already described for the apparatus of Figs. 2ª, 2ᵇ and 2ᶜ. A storage relay QS is provided for the field station which has a pick-up circuit easily traced and which includes the front contacts 72 and 73 of the despatcher controlled relays LGR and RGR. Once the storage relay QS is energized, it is retained energized by a stick circuit that includes its own front contact 195 and a front contact 196 of the switch indication relay KR. It follows that once the storage relay QS is energized in response to a switch operating impulse being received at the field station and relays LGR and RGR picked up, this storage relay remains energized after the control impulse has died away and the control relays deenergized until such time as there occurs an actual initiation of a movement of the switch that causes the deenergizing of the KR relay. In this form of apparatus embodying my invention the relays RWR and NWR are governed in part by the storage relay QS. To be explicit, the relay NWR of Fig. 3, for example, is controlled by a pick-up circuit that includes terminal B, front contact 197 of the approach locking relay RMR, front contact 198 of the approach locking relay LMR, front contact 199 of relay TSP, front contact 200 of storage relay QS, normal contact of polar armature 71 of relay IWR, back contact 75 of relay RWR, winding of relay NWR and to the terminal C of the current source. The relay NWR is provided with a stick circuit including its own front contact 77 which shunts around the polar armature 71 and the back contact 75 the same as in Fig. 2ᵇ. In a similar manner the relay RWR is provided with a pick-up circuit that is the same as that just traced for relay NWR up to the polar armature 71, thence by its reverse contact, back contact 79 of relay NWR, winding of relay RWR and to the terminal C. The stick circuit for relay RWR includes its own front contact 80 which shunts around polar armature 71 and the back contact 79. The energizing of relay NWR causes current of reverse polarity to be supplied to the winding of relay IWR while the energizing of relay RWR causes current of normal polarity to be supplied to the winding of relay IWR the same as pointed out heretofore. It follows, therefore, that relay QS will store a switch control impulse from the office station whenever one of the approach track sections is occupied and the corresponding approach locking relay deenergized or if the main track section is occupied and the repeater relay TSP deenergized. As soon as the train clears the section in question and the corresponding relay is again picked up, the proper relay NWR or RWR is selected and the desired movement of the switch then takes place in the usual manner. As soon as the relay KR becomes deenergized, the stick circuit for relay QS is ruptured and it is returned to its normal position. Should it be desired to permit the storing of a switch control impulse only when a train occupies the main track section IT, the front contacts 197 and 198 would be removed from the circuit for the relays NWR and RWR. In all other respects the apparatus of Fig. 3 will function in a manner similar to the apparatus of Figs. 2$^b$ and 2$^c$.

It is to be noted that the normal shunt path for the winding of relay IWR of Fig. 3 includes a back contact 201 of the storage relay QS and thus as the relay QS is picked up, this shunt path is removed permitting the operation of the relay IWR to follow the subsequent energizing of either relay RWR or NWR.

In the modified form of the field apparatus shown in Fig. 4 provision is made for automatically returning the switch to its former position when the switch points meet an obstruction which prevents the desired movement being completed. The control of the storage relay QS and that for the relays RWR and NWR is the same as described for Fig. 3 except as follows. Relay NWR is provided with an additional energizing circuit that includes a normally opened contact 203 of the thermo relay N$th$, and the relay RWR is provided with an additional energizing circuit that includes the normally opened contact 204 of the thermo relay R$th$, as will readily be understood by an inspection of Fig. 4. The heating winding 45 of relay N$th$ in place of being connected in series with the motor circuit as disclosed in Fig. 2$^b$, is now provided with an independent circuit from the BX terminal of the current source, heating winding 45, normal contact of polar armature 205 of relay IWR, front contact 206, circuit controlling contact 207 actuated by the switch SW and closed during all intermediate positions of the switch, and thence to the CX terminal of the current source. In like manner the heating winding 45 of the thermo relay R$th$ is provided with an independent circuit similar to that already described for relay N$th$ except it includes the reverse contact of the polar armature 205 of relay IWR.

A switch control impulse that causes contacts 72 and 73 of relays LGR and RGR, respectively, to be closed and energize the storage relay QS is thus effective to pick up the relay NWR and apply current of reverse polarity to relay IWR and bring about the reversing of the switch. Should the switch points meet an obstruction as they are being thus reversed and the motor continues in its attempt to move against the obstruction for a predetermined time, the heating winding 45 of relay R$th$ becomes heated to a point where the contact 204 is closed completing the circuit to the relay RWR from terminal B, contact 204, winding of relay RWR and to terminal C. As relay RWR picks up, it opens the stick circuit for relay IWR at its back contact 65 and applies to the winding of IWR current of normal polarity so that that relay now becomes energized in its normal position. The motor M is reversed in its operation and moves the switch back to its normal position. As soon as the winding 45 of relay R$th$ cools down, the contact 204 opens and relay RWR becomes deenergized. When the switch has reached its full normal position, a normal switch indication impulse is transmitted to the office station in the usual manner to reestablish the normal switch indication lamp, calling the despatcher's attention to the fact that some obstruction prevents the switch from being moved to its reverse position and it has been automatically returned to its normal position. The automatic return of the switch back to the reverse position when its points meet an obstruction as it is being moved from the reverse to normal position will take place in a similar manner except the thermo relay N$th$ is active in place of the relay R$th$.

In Fig. 5 a polarized directional signal controlling relay HR is provided. The relay HR normally has its winding short-circuited by virtue of one terminal being connected to the N terminal of the current source through a back contact 208 of the control relay LGR and its other terminal being also connected to the same N terminal through the back contact 209 of the control relay RGR. When a signal control current is received at the field station that selects the control relay LGR to control an L signal, the relay HR is supplied with current which I will call reverse polarity due to the fact that the contact 208 of relay LGR is raised out of engagement with its back contact connected to the N terminal and brought into engagement with its front contact which is connected to the B terminal of the current source. A signal control current that selects the control relay RGR causes the relay HR to be energized with current of normal polarity as the contact 209 is now raised into engagement with its front contact which is connected to the B terminal of the current source.

The front contact 210 of relay HR and the normal contacts of its polar armatures 211 and 212 are included in the circuit network for the signal controlling relays RBH and RAH, respectively. To close the signal network to the signal controlling relay LAH or LBH requires the closing of the front contact 210 of relay HR and a reverse contact of its polar armature 212 or 211.

The back contact 213 of relay HR is connected in the circuit network for the control relay LGR in parallel with a back contact 214 of the control relay RGR. Likewise, the back contact 215 of relay HR is connected in a circuit network for the control relay RGR in parallel with a back contact 216 of relay LGR. This last arrangement in the control of the despatcher controlled relays avoids possibility of an L signal control impulse and an R signal control impulse when transmitted close together, as might take place should the operator quickly move the signal control lever LV from its $l$ position clear over to the $r$ position without coming to rest at the $n$ position, from picking up the RGR relay before the LGR relay has dropped and thereby initiate a switch movement due to both control relays being momentarily up at the same time. Likewise, an L signal control impulse closely following an R signal control impulse cannot falsely initiate an operation of the switch by causing both control relays to be momentarily up at the same time.

In Fig. 7 I have disclosed a modification of the apparatus at the field station that might be used when the switch machine SW is of a type permitting manual operation of the switch by apparatus such as disclosed in the United States Patent No. 1,796,323, granted March 17, 1931, to C. W. Dalzell and E. G. Little for Railway switch operating apparatus. A relay WLP is provided which is normally retained energized by a simple circuit closed by contact 217 operated by the hand selector lever of the apparatus of the above cited Dalzell and Little patent. The pick-up circuit for the track relay ITS of the main track section IT is modified from that disclosed in Fig. 2ᶜ to include a front contact 218 of relay WLP in series with the back contacts 4 and 5 of the despatcher controlled relays LGR and RGR, respectively. The operation of the field station apparatus when modified as shown in Fig. 7 for control of the switch SW from the office station will be the same as described in detail heretofore. When a train crew at the switch location desires to hand operate the switch and permission to do so has been obtained from the despatcher, the train crew by operating the selector lever associated with the switch machine causes relay WLP to become deenergized by the opening of the contact 217. The track relay ITS and its associated repeater relay TSP will both become deenergized by the shunting of the track section IT in the usual manner. The despatcher at the office station will operate the push button PB to extinguish the existing switch indication lamp 132 or 133 as the case may be, thereby providing an indication that he has given up control of the switch. As is the usual practice a tag will be placed on the push button as a further means of reminding the despatcher that the switch is being hand operated. The operation of the push button PB under this condition can result in no function being produced at the switch as the circuit to both the despatcher controlled relays LGR and RGR is now held opened at the contacts 180 and 181 of relays ITS and TSP. When hand operation of the switch is concluded and the selector lever of the switch machine restored to its normal position, the closing of the contact 217 immediately reenergizes the relay WLP. As the pick-up circuit for the relay ITS is now closed, the relays ITS and TSP will be restored to their normal condition. If the switch has been returned to the position it was in before hand operation was initiated so that agreement exists between the position of the polar armatures of relay IWR and the circuit controlling contacts 10, 11, 12 and 13, the relay KR is reenergized and a switch indication impulse automatically transmitted from the field station during the interval between the picking up of relay ITS and the subsequent closing of the front contacts of the slow pick-up repeater relay TSP. This indication impulse acts to reestablish the switch indication lamp corresponding to the position of the switch indicating to the despatcher that hand operation of the switch is completed and that he has regained control. In case the switch was left in a position other than the position it had originally occupied the despatcher by depressing the push button PB will establish agreement between the relay IWR and the circuit controller contacts operated by the switch and an indication of the true position of the switch automatically established. It is to be noted that a signal cannot be cleared by the despatcher in the event the position of the switch does not agree with the position of the IDR relay due to the fact that agreement must exist between the position of the polar armature 85 of the switch controlling relay IWR and the position of the polar armature 86 and 94 of the indication relay KR before a circuit can be completed for a signal controlling relay.

Referring to Fig. 1ª, a form of control apparatus is disclosed whereby a battery located at the office station and a second battery located at the field station are utilized as the sources of the control and indication influences. In this form of apparatus embodying my invention, the office station is provided with a signal controlling lever LV and its associated indication lamps, a switch controlling push button PB and its associated relay PBR, normal and reverse switch indication relays NWE and RWE with their respective indication lamps and the two control relays RKP and LKP the same as disclosed in Figs. 1 and 2ª. In Fig. 1ª the office station is further provided with a relay group consisting of two relays V and VA, a lock relay LS and a battery 220 having a center connection designated by the reference character C. The battery 220 has its center terminal C permanently connected to the common line wire Com through a resistor 250 while its opposite terminals B and N are connected to the line wire L through the office apparatus as will be described later. As will shortly appear, the battery 220, resistance 250 and the group of relays V and VA take the place of the transformer T, tuned alternator TA, relay POR and rectifiers 121 and 122 disclosed in Fig. 2ª. As no sequential operation of the relays is required in this form of apparatus the polar relay HKP is also omitted. To avoid the possibility of the flash of a signal indication during the reception of a switch indication, at such time as when the signal lever LV has been operated before the switch indication has been received, the lock relay LS is provided in the equipment of Fig. 1ª. At the field station of Fig. 1ª the transformer T, relay POR, tuned alternator TAI and rectifiers 130 and 131 disclosed in Fig. 2ᵇ are replaced by a battery 221 and a resistor 248. The center terminal C of battery 221 is permanently connected to the common line wire through the resistor 248 and its opposite terminals B and N are connected to the line wire L through the field station equipment as will shortly appear. In all other respects the equipment provided at the field station when the control apparatus takes the form shown in Fig. 1ª will be identical to that already described in detail in connection with Figs. 2ª, 2ᵇ and 2ᶜ. That is to say, the control to be effected at the field station by the apparatus of Fig. 1ª governs the switch and signal controlling apparatus in the same manner as described for the apparatus of Figs. 2ª, 2ᵇ and 2ᶜ.

The signal lever LV of Fig. 1ª is preferably of the panel type wherewith a comparatively large number of circuit controlling contacts are readily operated by a single panel lever. Such circuit controlling levers are well-known to the art and as it forms no part of my invention, it will suffice for this application to point out that the lever LV is pivoted at O and has three resting positions $n$, $r$ and $l$. When lever LV occupies its normal position $n$, the associated contact assembly occupies the position shown in Fig. 1ᵃ. Lever LV when rotated to its position $l$ causes contact spring 222 to be lifted to disengage the contact spring 225, contact spring 223 to be lifted to engage contact spring 226, and contact spring 224 to be lifted to disengage contact spring 227 and to engage contact spring 228. Lever LV when rotated to its $r$ position causes contact spring 229 to be disengaged from spring 230, contact spring 231 to engage contact spring 232 and contact spring 233 to disengage contact spring 234 and to engage contact spring 235.

To energize the relay PBR of Fig. 1ᵃ the push button PB is depressed and current supplied from the B terminal of battery 220 over back contact 236 of relay LKP, shown at upper left-hand corner of Fig. 1ᵃ, contact 233—234, resistance 120, winding of relay PBR, back contact 119 of push button PB, contact 224—227, back contact 237 of relay RKP and to the N terminal of battery 220. The two relays V and VA are associated with the relay PBR in the following manner. As relay PBR is picked up, current flows from the B terminal of battery 220 over front contact 238 of relay PBR, back contact 239 of relay VA and winding of relay V to the center C terminal of battery 220. As soon as relay V picks up, current is supplied over the same circuit up to the contact 238 and thence through front contact 240 of relay V and winding of relay VA to the center C terminal of battery 220. It follows, that as long as the front contact 238 of relay PBR remains closed, the two relays V and VA will be alternately energized and deenergized each one controlling the flow of current to the winding of the other. Rectifiers 241 and 242 may be connected across the windings of relays V and VA.

During the first instance after relay PBR is picked up a control impulse of current will flow from the B terminal of battery 220 through front contact 238, back contact 243 of relay V as that relay is not yet picked up, front contact 244 of relay PBR, wire 245, back contacts 246 and 247 of the indication relays NWE and RWE, respectively, as both of these relays are deprived of current when the relay PBR is picked up in the same manner as in Fig. 2ᵃ, line wire L, back contact 183 of the switch controlling relay IWR at the field station, back contacts 187 and 188 of signal controlling relays LAH and LBH, respectively, winding of the control relay RGR, rectifier 129, the common return wire Com and resistor 250 to the center terminal C of battery 220. The next instant the relay V picks up and an impulse of current flows from the center terminal C of battery 220 through resistor 250, common line wire Com, rectifier 128, winding of relay LGR, back contacts 185 and 186 of signal controlling relays RAH and RBH, respectively, back contact 183 of relay IWR, line wire L, back contacts 247 and 246, wire 245, front contact 244 of relay PBR and front contact 249 of relay V to the N terminal of battery 220. The two relays V and VA are arranged to be much faster in operation than the control relays LGR and RGR at the field station and thus it follows that with relays V and VA alternately operated impulses of current alternately flow in opposite directions in the line circuit and thus alternately flow in the two loop circuits at the field station and simultaneously energize the two control relays RGR and LGR. These impulses of current continue as long as the relay PBR remains picked up causing the front contact 73 of relay RGR and the front contact 72 of the relay LGR both to be closed at the same time with the result that the switch controlling apparatus will be caused to function in the same manner as described in detail in connection with Figs. 2ᵃ, 2ᵇ and 2ᶜ. In the event the switch is operated from its normal to its reverse position and the polar armature 189 of the switch indication relay KR operated to its right-hand position a reverse switch indication impulse is supplied to the communication circuit during the slow release period of the signal controlling relay IWR. This reverse switch indication impulse will flow from the center terminal C of battery 221 at the field station through resistor 248, common return wire Com, contact 222—225, winding of relay RKP, rectifier 127, back contact 125 of relay PBR, wire 245, back contacts 246 and 247 of relays NWE and RWE, respectively, line wire L, front contact 183 of relay IWR, and the right-hand contact of the polar armature 189 of relay KR to the N terminal of battery 221. The picking up of the relay RKP during the slow release period of relay IWR causes current to be supplied from the terminal B of battery 220 over the front contact 252 of relay RKP, wire 253, back contacts 254 and 255 of relays RWE and NWE, respectively, and winding of the lock relay LS to the C terminal of battery 220. This lock relay LS once picked up is retained energized by a stick circuit that includes the front contact 252 of relay RKP, wire 256, its own front contact 257 and the winding of relay LS to the terminal C of battery 220. With relay RKP and lock relay LS both picked up the reverse switch indication relay RWE and the reverse switch indication lamp 133 are energized by virtue of a circuit extending from the terminal B of battery 220 through back contact 258 of relay PBR, wire 259, front contact 260 of relay LS, front contact 261 of relay RKP, back contact 139 of relay NWE, winding of relay RWE and lamp 133 in parallel to the terminal C of battery 220. To prevent relay RKP from becoming deenergized as the relay RWE picks up to open the back contact 247 in the office loop circuit a stick circuit is provided for relay RKP around back contact 247 and which branches from wire 245 through the front contact 273 of relay RKP and to the line wire L as will be readily understood by an inspection of Fig. 1ᵃ. At the end of the reverse switch indication impulse, that is, at the end of the release period of relay IWR, the relay RKP is deenergized and the lock relay LS deenergized in turn by the opening of its stick circuit at the front contact 252 of relay RKP. The reverse switch indication relay RWE is now retained energized, however, by virtue of its stick circuit that includes its own front contact 140 the same as in Fig. 2ᵃ.

In the event the simultaneous energizing of the two control relays RGR and LGR at the field station has brought about a movement of the switch from its reverse to its normal position so that the polar armature 189 of relay KR occupies its left-hand position a normal switch indication impulse is supplied to the communication circuit during the slow release period of the switch controlling relay IWR. This time the indication current flows from the terminal B of the field battery 221 through the left-hand contact of armature 189, front contact 183 of relay IWR, line wire L, back contacts 247 and 246 in series, wire 245, back contact 125 of relay PBR, rectifier 126, winding of relay LKP, contact 229—230 of lever LV, common return wire Com and resistor 248 to the center terminal C of battery 221. The picking up of relay LKP by this indication current during the release period of relay IWR closes the pick up to the lock relay LS the same as above traced except that the circuit now includes the front contact 262 of relay LKP instead of the front contact 252 of relay RKP, and the lock relay LS is then retained energized by its stick circuit that now includes the front contact 262. With both relays LKP and LS energized, current will flow to the normal switch indication relay NWE and the normal switch indication lamp 132 by a circuit extending from the terminal B of battery 220 through back contact 258 of relay PBR, wire 259, front contact 260 of relay LS, front contact 263 of relay LKP, back contact 136 of relay RWE and the winding of relay NWE and lamp 132 in parallel to the terminal C of battery 220. Relay LKP is provided with a stick circuit that branches around the back contact 255 of relay NWE and which extends from the wire 245 through its own front contact 272 and to the line wire L to insure that the relay LKP is not deenergized as the relay NWE picks up. At the end of the normal switch indication impulse the relay LKP will be dropped and in turn the lock relay LS is deenergized but the normal switch indication relay NWE is retained energized by virtue of its stick circuit that includes its own front contact 135 the same as in Fig. 2ª.

From the foregoing it is to be seen that an operation of the push button PB of Fig. 1ª picks up the relay PBR causing the relays V and VA to be alternately operated, each relay controlling the other. The alternate operation of relays V and VA in turn causes pulses of current from battery 220 to alternately flow in opposite directions in the communication circuit. These impulses of current alternately flowing in opposite directions alternately energize the two loop circuits at the field station with the result that the two control relays RGR and LGR are simultaneously energized causing thereby an operation of the switch mechanism. In the event the switch is moved to its reverse position the field apparatus supplies from the field battery 221 a reverse switch indication impulse during the slow release period of the switch controlling relay IWR. This reverse switch indication impulse flows in a direction to energize the loop circuit at the office station that includes the relay RKP and the rectifier 127 with the result that the reverse switch indication relay RWE is energized after which it is retained energized by a local stick circuit and the reverse switch indication lamp 133 continuously displayed. In the event the switch mechanism has operated the switch to its normal position the switch indication impulse supplied from the battery 221 during the release period of relay IWR flows in the communication circuit in a direction to pass through the office loop circuit that includes the relay LKP and the rectifier 126. Picking up of the relay LKP during this indication impulse results in the normal switch indication relay NWE being picked up after which it is retained energized by its stick circuit and the normal switch indication lamp 132 is continuously displayed. It is to be noted that as the push button PB is operated and the relay PBR subsequently picked up, the stick circuit for relay NWE or RWE, whichever relay happens to be energized at the time, is opened causing these two relays to both become deenergized as the switch control impulse is initiated. It is apparent, therefore, that the control effected by the apparatus of Fig. 1ª accomplishes the same operation for the railway switch as the apparatus of Fig. 1. The difference between the two forms being that in place of the full wave alternating current utilized in Fig. 1 for simultaneously energizing the control relays at the field station, the two relays V and VA are alternately operated at a sufficiently rapid rate that the alternate impulses of current supplied from the battery 220 alternately circulate through the two loop circuits at the field station to simultaneously energize the two control relays. The reverse switch indication current supplied to the communication circuit during the slow release period of the relay IWR instead of being rectified current which flows from the source at the field station over the common line wire, through a corresponding loop circuit at the office station and back over the line wire L as described in Fig. 1, is a steady impulse of direct current supplied by the battery 221 at the field station of Fig. 1 and this impulse flows in a direction to circulate through the proper loop circuit at the office station. Likewise the normal switch indication impulse instead of being rectified current as in Fig. 1 is now a steady impulse of direct current supplied from the battery 221.

It is to be noted that in case the despatcher operates the signal lever LV to a control position immediately after having operated the push button PB and before the switch indication has been received at the office station, the office loop circuits are retained intact awaiting the receipt of the switch indication impulse even though the contact 229—230 or 222—225 of lever LV may have been opened. In the event lever LV has been operated from its normal position n to its r position and the switch indication impulse is one that flows towards the office station over the line wire L, the office loop circuit can be traced from the line wire L through the back contacts 247 and 246, wire 245, back contact 125, rectifier 126, winding of relay LKP, back contact 266 of relay RWE, back contact 267 of relay NWE, wire 251, contact 222—225, and thence to the common return wire Com. In the event the lever LV has been operated from its normal position n to its l position ahead of a receipt of a switch indication impulse that flows towards the office station over the common return wire, the office loop circuit now includes contact 229—230, back contact 266 of relay RWE, back contact 267 of relay NWE, winding of relay RKP, rectifier 127, back contact 125, wire 245, and back contacts 246 and 247 to the line wire L. Thus, immediate operation of the signal lever LV after an operation of the push button PB is permissible with the apparatus of Fig. 1ª the same as with the apparatus of Fig. 2ª. The signal control impulse will now, however, be initiated until the switch indication influence has been duly received at the office station and the corresponding apparatus functioned properly. It will also be noted that operating the signal lever LV to either its r or l position opens contact 233—234 or contact 224—227 in the energizing circuit for the relay PBR, and thus it follows that an operation of the push button PB is ineffective to transmit a switch controlling influence at such times as the signal lever LV occupies either its r or l position.

I will next consider the manner of transmitting the signal control influences by the apparatus of Fig. 1ª and the return of the proper signal indication influences. The normal switch indication lamp 143 is supplied with current from the terminal B of battery 220 over the back contact 236 of relay LKP, contact 233—234 of lever LV, lamp 143, contact 224—227, back contact 237 of relay RKP and to the opposite N terminal of battery 220. Assume now that the despatcher moves the lever LV to the r position where contact spring 229 is made to disengage contact spring 230, contact spring 231 is made to engage contact 232 and the contact spring 233 is made to disengage the contact 234 and to engage the contact 235, the normal signal indication lamp 143 is extinguished by the opening of its circuit at the contact 233—234. With lever LV in its r position steady direct current is supplied from the B terminal of battery 220 through the back contact 236 of relay LKP, contact 233—235, front contact 141 of relay NWE or front contact 142 of relay RWE depending upon which of these switch indication relays is energized at the time, line wire L, back contact 183 of relay IWR, back contact 187 and 188 of the signal controlling relays LAH and LBH, respectively, winding of the control relay RGR, rectifier 129, common return wire Com and resistor 250 to the terminal C of battery 220. This steady flow of direct current will continuously retain the control relay RGR picked up as long as the lever LV remains in the r position. The closing of the front contacts 89 and 97 of relay RGR will select the signal controlling relay RAH or RBH, in accordance with the position of the switch the same as described in connection with the apparatus of Figs. 2ᵇ and 2ᶜ, and the corresponding signal RA or RB will be cleared. It is to be noted that in this form of apparatus the signal controlling current circulates through no office loop circuit as was the case in the form of apparatus shown in Fig. 1 to initiate a sequential operation. As relay RAH or RBH is picked up to clear the corresponding signal the field station battery 221 supplies a steady direct current for energizing the control relay RKP at the office station and establishing the R signal indication lamp 145. The circuit for this signal indication current can be traced from the C terminal of battery 221 through resistor 248, common return wire Com, contact 222—225 of lever LV, 251, winding of relay RKP, rectifier 127, back contact 125 of relay PBR, contact 231—232, front contact 141 of relay NWE or front contact 142 of relay RWE, line wire L, back contact 183, front contact 186 of relay RBH or front contact 185 of relay RAH depending on which of these relays was selected, and to the terminal N of battery 221. With relay RKP picked up and held energized by this signal indication current, the signal indication lamp 145 is supplied with current from terminal B of battery 220 through lamp 145, back contact 264 of lock relay LS, front contact 265 of relay RKP and to the terminal N of battery 220. It is to be noted that the signal control current flows from the battery 220 at the office station out over the line wire L through the loop circuit including relay RGR and rectifier 129, and back to the office station over the common return wire, while the indication current flows from the battery 221 at the field station towards the office station over the common return wire through the office loop circuit including relay RKP and rectifier 127 and back to the field station over the line wire L. The rectifier 129 prevents the indication current from the battery 221 from affecting the active control relay RGR while the selected signal controlling relay RAH or RBH opens at its back contact 185 or 186 the other field loop circuit preventing thereby the indication current from influencing the control relay LGR. At the office station the rectifier 127 prevents the control current from the battery 220 from influencing the relay RKP while the contact 229—230 opened by the lever LV in its r position holds open the office loop circuit which includes the relay LKP.

While there exists a possible short circuit path for the control current at the field station as soon as the signal controlling relay RAH or RBH is picked up, the resistor 248 prevents the shunting of the now energized control relay RGR and also prevents the short circuit current from assuming damaging magnitude. This extraneous path can be traced from the back contact 183 of relay IWR through front contact 186 of relay RBH or front contact 185 of relay RAH, the right-hand half of battery 221 in series and resistor 248 to the common return wire Com, and is in parallel with the ordinary loop circuit that includes the relay RGR and rectifier 129. As just stated however, the resistor 248 is made of such value that this extraneous path will not shunt the relay RGR and prevents the current flowing in this extra circuit being of damaging magnitude. In a similar manner a short circuit path exists at the office station in parallel with the active loop circuit. This short circuit path at the office station can be traced from the common wire Com through resistor 250, left-hand half of battery 220 in series, thence from the B terminal of battery 220 through the back contact 236 of relay LKP shown at the upper left-hand corner of Fig. 1ª, contact 233—235, front contact 141 or 142 depending upon which relay NWE or RWE is energized at the time and to the line wire L. The resistor 250 is made of such value that this path will not shunt the relay RKP and prevents the short circuit current from being of damaging magnitude.

The relay RKP at the office station is provided with a stick circuit that is effective at this time to retain the relay RKP energized in the event the despatcher moves the lever LV from its r position to one of its other positions, until the signal that has been cleared by the lever LV being moved to its r position has actually been returned to its stop position. This stick circuit can be traced from the common wire Com through the front contact 268 of relay RKP which forms a shunt around the contact 222—225 of lever LV, winding of relay RKP, rectifier 127, back contact 125, wire 245, and front contact 273 which forms a shunt around the contact 231—232, and thence to the line wire L. Relay RKP will thus be retained energized and the signal indication lamp 145 displayed even after the lever has been moved away from its r position until the corresponding signal controlling relay at the field station has actually released to set the corresponding signal in the stop position and to discontinue the indication current.

When the lever LV has been moved to the l position, steady direct current is applied to the communication circuit that flows from the source at the office station over the common return wire, through the corresponding loop circuit at the field station and back to the office station over the line wire L. To be explicit, the circuit for this signal control current extends from the center terminal C of battery 220 through resistor 250, common return wire Com, rectifier 128, control relay LGR, back contacts 185 and 186 of relays RAH and RBH, respectively, back contact 183 of relay IWR, line wire L, front contact 142 or 141 of relay RWE or NWE depending upon which relay is picked up at the time, contact 224—228, back contact 237 of relay RKP and to the terminal N of battery 220. The energizing of the control relay LGR to close the front contacts 91 and 99 causes the signal controlling relay LBH or LAH to be selected in accordance with the position of the switch and a corresponding signal LA or LB to be cleared the same as in Fig. 2b. As soon as one of the signal controlling relays LAH or LBH is picked up, a signal indication current flows from the B terminal of the field battery 221 through front contact 187 of relay LAH or front contact 188 of relay LBH, back contact 183 of relay IWP, line wire L, front contact 142 or 141, contact 223—226, back contact 125 of relay PBR, rectifier 126, winding of relay LKP, contact 229—230, common return wire Com and resistor 248 to the center terminal C of battery 221. The energizing of the relay LKP by this signal indication current permits current to be supplied to the L signal indication lamp 144. The circuit for lamp 144 includes terminal B of battery 220, front contact 269 of relay LKP, back contact 270 of the lock relay LS, signal lamp 144 and to the N terminal of battery 220. Hence, with lever LV occupying the l position steady signal control current flows from the office station out over the common return wire through the loop circuit including the rectifier 128 and relay LGR and back over the line wire L, while at the same time a steady indication current flows from the source at the field station towards the office station over the line wire L through the office loop circuit including the relay LKP and rectifier 126 and returns to the field station over the common line wire. This time the rectifier 128 prevents the indication current from the battery 221 affecting the active control relay LGR and the other loop circuit at the field station is held open at the back contact of the selected signal controlling relay LAH or LBH. At the office station the rectifier 126 prevents the control current from affecting the active relay LKP while the other loop circuit at the office station is held open at the contact 222—225 of lever LV.

Upon the picking up of either signal controlling relay LAH or LBH a shunt path is formed through which the control current will flow in parallel with the field loop circuit. This shunt path extends from the common return wire Com through resistor 248, the left-hand half of battery 221, front contact 188 of relay LBH or front contact 187 of relay LAH depending upon which relay has been selected and thence to the line wire L. The resistor 248 is such as to prevent this extra path from shunting the control relay LGR and to restrict the current flow in the shunt path. Likewise, at the office station a shunt path is formed through which the indication current will pass in parallel with the loop circuit. This shunt path extends from the line wire L through front contact 142 or 141, contact 224—228, back contact 237 of relay RKP, the right-hand half of battery 220 and resistor 250 to the common return wire. The resistor 250 is made such as to prevent this shunt path from shunting the relay LKP and also preventing the short-circuiting current from being of damaging magnitude.

Relay LKP is provided with a stick circuit similar to that described for the relay RKP and which is effective at this time to retain the relay LKP energized in the event the lever LV is operated from its l posiiton to either one of its other positions, until such time as the signal controlling relay which has been picked up in response to the operating of the lever LV to its l position, has actually released to set the corresponding signal at stop and to discontinue the flow of the indication current. This stick circuit for relay LKP extends from the line wire L through front contact 272 of relay LKP, wire 245, back contact 125, rectifier 126, winding of relay LKP and the front contact 271 to the common return wire.

It is to be noted that to establish an R signal indication by energizing the lamp 145 or to establish an L signal indication by energizing the lamp 144 requires that the lock relay LS be deenergized to close the back contact 270 or 264 as the case may be. It will be recalled that in establishing either the normal or reverse switch indication the lock relay LS had to be energized to complete the pick-up circuit for the switch indication relay. Thus it follows that in cases where the despatcher operates the signal lever LV to either the r or l position before the switch indication impulse has been received at the office station, the picking up of the lock relay LS prevents the switch indication impulse from causing a flash of a signal indication lamp. It is also to be noted that to transmit a signal control influence requires the opposing control relay to be deenergized at the time. That is, if lever LV is moved to its r position, the relay LKP must be deenergized to close its back contact 236 before a signal control current can be transmitted. If lever LV is moved to its l position then the control relay RKP must be down to close its back contact 237. Hence in the event the despatcher should quickly move the lever LV from its r position to its l position or from its l position to its r position there will not result two signal control influences following each other so closely as to cause a momentary energizing of both relays LGR and RGR at the field station which might initiate a switch operation.

Figure 1A:
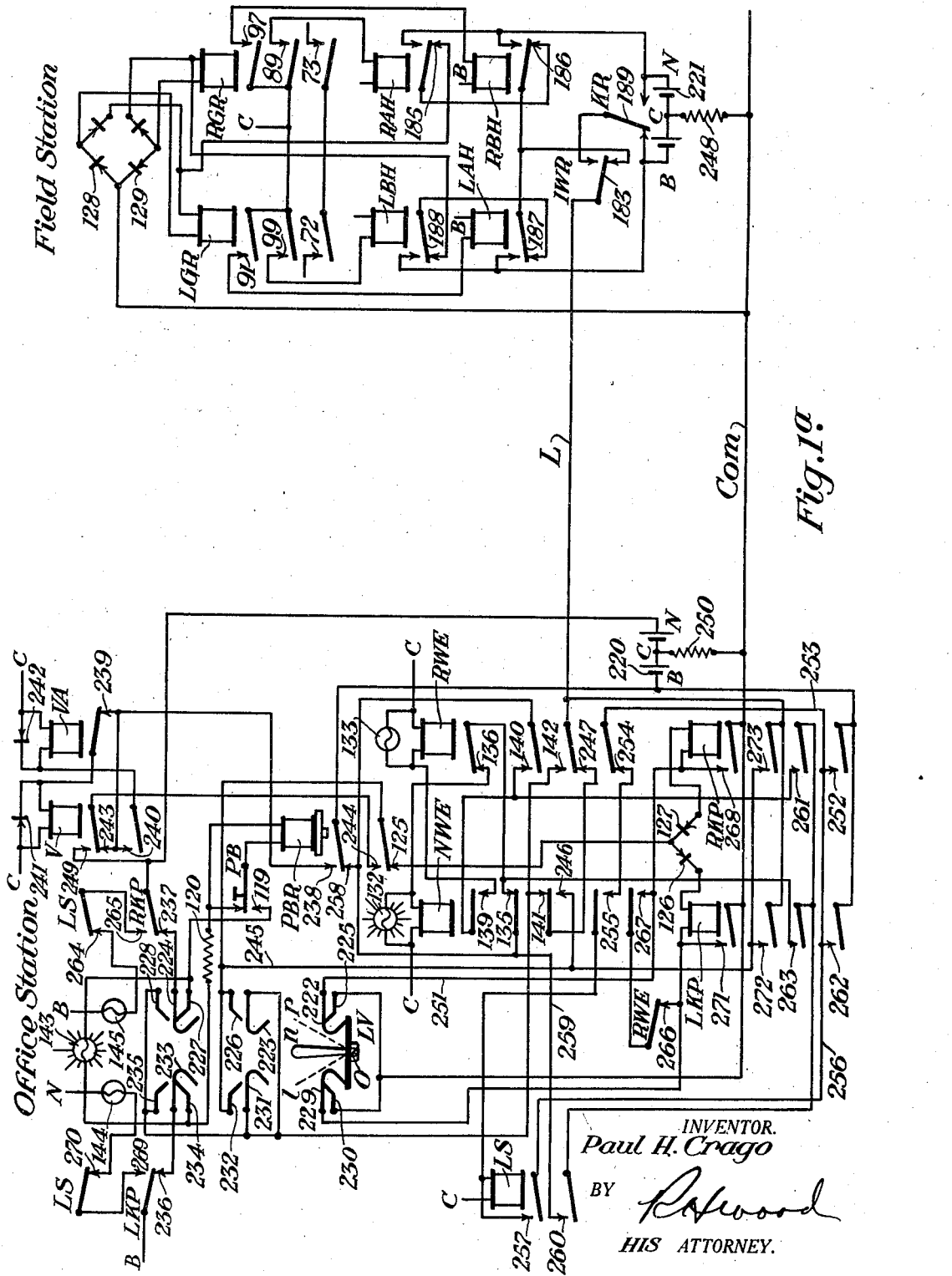

From the foregoing description of the apparatus of Fig. 1a it is to be seen that the control of the signal and the return of a corresponding indication current is accomplished in the same method as obtained by the apparatus of Fig. 1. It is clear therefore, that the complete two-way control effected between the office station and the field station by the apparatus described for Figs. 1, 2a and 2b is also obtained by the apparatus disclosed in Fig. 1a.

In a remote control system such as here disclosed there is provided at the office station and at the field station a source of current and the two stations are connected together by a single control circuit consisting or a pair of line wires. At each station two loop circuits are provided which comprise a half wave rectifier and a relay adapted to pass current flowing in a given direction only. A switch control influence is obtained by the office station holding open its own loop circuits and reversibly supplying pulses of current to the control circuit which alternately circulates through the two loop circuits at the field station to energize both the control relays simultaneously. At the termination of the switch control influence and the operation of the switch the switch indication influence is accomplished by the field apparatus holding open its loop circuits and supplying current to the control circuit which flows in one direction or the other depending upon the position of the switch, and which circulates in a corresponding loop circuit at the office station. A signal control influence is obtained by the office station continuously supplying current to the control circuit which flows in one direction or the other, depending upon whether it is an R or an L signal that is to be cleared and which current circulates through a corresponding loop circuit at the field station to retain energized the associated relay. A signal indication influence is accomplished by the field station apparatus holding open its loop circuit not already influenced and supplying to the control circuit a current which flows in the same direction as the control circuit and which circulates through a corresponding loop circuit at the office station.

To put it in another way, the remote control system here disclosed provides full operation of a railway switch from either of its extreme positions or from any point in mid stroke by the depressing of a push button at an office station to apply to a control circuit pulses of current that alternately flow in opposite directions. The information of the full normal or full reverse operation of the switch is conveyed to the office station over the same control circuit by supplying for a short interval of time current that flows in one direction or the other depending upon the position of the switch. The time the push button is held depressed is not critical since it may be released at once and the full operation obtained or if it is continuously held down, the full operation is accomplished except that the final indication is held stored until such time as the push button is actually released. The function of clearing a signal is accomplished by the office apparatus continuously supplying to the control circuit current that flows steadily in either one direction or the other depending upon whether it is an R signal or an L signal that is to be cleared. The information that the desired signal is clear is conveyed back to the office station by the field apparatus continually supplying to the control circuit current that flows in the control circuit in the same direction as the signal control current.

Although I have herein shown and described only certain forms of apparatus for remote control systems embodying my invention, it is understood that various changes and modifications may be made therein within the scope of the appended claims without departing from the spirit and scope of my invention.

Having thus described my invention, what I claim is:

1. A remote control system including, a pair of control wires connecting two remotely located stations, a pair of loop circuits at each station receiving current from said control wires each adapted to pass current flowing in one direction only and arranged for opposite directions, a control device for each loop circuit energized in response to current flowing in its loop circuit, manually operated means at one station for causing current to flow in the control wires either in one direction or the other for energizing the control device of the corresponding loop circuit at the other station, an operating mechanism having different conditions selectively governed by the control devices at said other station, and circuit means governed by the operating mechanism for causing current to flow in the control wires in a direction in accordance with its condition for energizing the control device of the corresponding loop circuit at said one station for establishing a corresponding condition of an indicating device, said manually operated means and said circuit means so arranged that the current supplied to the two control wires at each of the two stations at any given time both flow in the same direction in said control wires whereby the control devices at the two stations are simultaneously energized each by the current supplied at the opposite station.

2. A remote control system including, a pair of control wires connecting two remotely located stations, a loop circuit including a rectifier and a relay at each station adapted to pass current in one direction only and arranged that one passes current flowing in one direction and the other in the opposite direction, means including a current source at one station adapted to at times cause current to flow in said control wires in a direction to pass through the loop circuit at the other station for energizing its relay, an operating means at said other station governed by its relay and moved to a given position when said relay is energized, means including a current source rendered effective by the operating means in said given position to cause current to flow in the control wires in a direction to pass through the loop circuit at said one station for energizing its relay, and an indicating means governed by the relay at said one station whereby there is indicated at said one station the position of the operating means simultaneously with the control of the operating means from said one station.

3. A remote control system including, a pair of control wires connecting two remotely located stations, a circuit means including a current source at each station arranged that at times both are active to supply current to said control wires, a loop circuit including a rectifier and a relay at each station connected to said control wires and arranged that each passes the current supplied by the source at the opposite station and substantially blocks the flow of current supplied by the source at the same station whereby the relays are simultaneously energized each by the current supplied at the opposite station, and means for preventing the circuit means at one station from forming a short circuit path for the current supplied at the opposite station.

4. A remote control system including a pair of control wires connecting two remotely located stations, a current source at each station adapted to supply current to the control wires, a loop circuit including a rectifier and a relay at each station connected to said control wires and arranged that each passes the current supplied by the source at the opposite station and substantially blocks the flow of current supplied by the source at the same station, means at one station for at times causing its source to supply current to the control wires to energize the relay at the other station, operating means governed by said relay and adapted to cause the current source at said other station to supply current to the control wires for energizing the relay at said one station whereby the relays are simultaneously energized each by the current supplied at the opposite station, and means for preventing the current source at one station from forming a short circuit path for the current supplied at the opposite station.

5. Apparatus for a remote control system including, a pair of control wires extending between two remotely located stations, manually controlled means at one station adapted to send over the control wires either the positive or the negative half-wave pulses of an alternating current, a receiving circuit at the other station connected to the control wires selectively responsive to the half-wave pulses to establish corresponding signaling conditions, sending means at the said other station controlled by its receiving circuit for sending over the control wires either the positive or the negative half-wave pulses of the alternating current in accordance with the established signaling condition, and a receiving circuit at the first mentioned station connected to the control wires selectively responsive to the half-wave pulses supplied at said other station to establish corresponding indication conditions, and said apparatus so arranged that when said one station is sending the positive half-wave pulses the said other station is sending the negative half-wave pulses and when said one station is sending the negative half-wave pulses the said other station is sending the positive half-wave pulses.

6. Apparatus for simultaneously communicating in both directions between two remote stations over a single communication channel including, a source of alternating current common to both stations, rectifying means at each station adapted to supply to the communication channel either the positive or the negative half-wave pulses of the alternating current, a receiving circuit at each station receiving current from the channel and selectively responsive to the polarity of the half-wave pulses received, a manually operated means at one station to select the polarity of the half-wave pulses supplied to the channel at that station to establish a corresponding condition of the receiving circuit at the other station, a signaling means selectively governed by the receiving circuit at said other station, circuit means controlled by the signaling means for causing the half-wave pulses supplied at its station to be of a polarity reverse to that of the pulses supplied at the first mentioned station for establishing a corresponding condition of the receiving circuit at the first mentioned station, and an indicating device at said first mentioned station governed by its receiving circuit.

7. A remote control system for railways including, an office station, a field station, a line circuit between said stations, a receiving circuit connected to the line circuit at the field station having two parallel branches each including a half-wave rectifier and a relay in series and arranged that one is responsive to current flowing in one direction and the other responsive to current flowing in the opposite direction, a first manually operated means at the office station adapted to send over the line circuit an alternating current to simultaneously energize both branches of the receiving circuit to control the operation of a railway switch, and a second manually operated means at the office station adapted to send over the line circuit either the positive or the negative half-wave pulses of alternating current to selectively energize one branch or the other of the receiving circuit to clear either an eastbound signal or a westbound signal governing traffic over the switch.

8. A remote control system for railways including, an office station, a field station, a line circuit between said stations, a receiving circuit having two parallel branches connected to the line circuit at the field station and arranged that one branch is responsive to current of positive polarity and the other to current of negative polarity, a first manually operated means at the office station adapted to send over the line circuit current periodically alternating in polarity to simultaneously influence both branches of the receiving circuit to control the operation of a railway switch, and a second manually operated means at the office station adapted to send over the line circuit current of positive polarity or current of negative polarity to selectively influence one branch or the other of the receiving circuit to clear either an eastbound signal or a westbound signal governing traffic over the switch.

9. A remote control system including an office station, a field station, a line circuit between said stations, a receiving circuit at the field station having two parallel branches each including a half-wave rectifier and a relay in series and arranged that one passes current of positive polarity and the other passes current of negative polarity, a first manually operated means at the office station adapted to send over the line circuit an impulse of alternating current to simultaneously influence both branches of the receiving circuit to control the operation of a railway switch, and a second manually operated means at the office station adapted to continuously send over the line circuit rectified half-wave pulses of alternating current of either positive or negative polarity to selectively energize one branch or the other of the receiving circuit to clear either an eastbound signal or a westbound signal to govern traffic over the switch.

10. A remote control system including, an office and a field station, means at the field station for continuously transmitting rectified half-wave pulses of alternating current of either positive or negative polarity in accordance with different conditions of traffic governing devices, indication relays at the office station selectively energized by such half-wave pulses, transmitting means at the office station for continuously sending control current to the field station for operating the traffic governing devices, and indication devices controlled jointly by said indication relays and by the control current and retained active only by the continuous active condition of both.

11. In combination, a railway switch operating means having a normal and a reverse position, a polarized switch controlling relay adapted when energized with current of normal polarity to operate the switch operating means to its normal position and when energized with current of reverse polarity to operate the switch operating means to its reverse position, a control member having a biased position and an operated position, and apparatus controlled by said member effective in response to each movement of the control member to its operated position to energize said relay with current of a polarity opposite from that with which said relay was last energized to thereby move the switch to the position opposite from that which it occupies at the time.

12. In combination, a railway switch operating means having a normal and a reverse position, a polarized switch controlling relay adapted when energized with current of normal polarity to operate the switch operating means to its normal position and when energized with current of reverse polarity to operate the switch operating means to its reverse position, a single push button, and means controlled by said push button rendered effective when the push button is operated to energize said relay with current of a polarity opposite from that with which said relay was last energized to thereby move the switch to a position opposite from that which it occupies.

13. In combination, a railway switch operating means, a polarized switch controlling relay arranged to operate the switch operating means to normal or reverse positions in accordance with its normal or reverse positions, a line circuit, means to send control impulses all of like character over said line circuit, electroresponsive means connected with said line circuit effectively energized by each such impulse, a pair of control relays, circuit means controlled by said electroresponsive means and including contacts of said switch controlling relay effective to selectively energize said control relays in response to each control impulse in accordance with the present position of the switch controlling relay, and other circuit means governed by said control relays arranged when a control relay is selected to energize the switch controlling relay with current of a polarity to cause it to be shifted to the position opposite from which it then occupies.

14. Apparatus for a remote control system including, a railway switch, a remote office, a polarized switch controlling relay responsive to current of normal and reverse polarity to govern the normal and reverse operations of the switch respectively, and means controlled in part by the switch controlling relay effective when the switch controlling relay occupies its normal position to supply current of reverse polarity to said controlling relay to cause a reverse movement of the switch in response to a control impulse of alternating current transmitted from the remote office and said means effective when the switch controlling relay occupies its reverse position to supply current of normal polarity to said controlling relay to cause a normal movement of the switch in response to a like control impulse of alternating current transmitted from the remote office.

15. Apparatus for a remote control system including, a railway switch, a remote office, a switch controlling device having a normal and a reverse position to govern the normal and reverse operations of the switch respectively, and means controlled in part by the switch controlling device effective when said device occupies its normal position to move said device to its reverse position for causing a reverse operation of the switch in response to a control impulse of current transmitted from the remote office and said means effective when said controlling device occupies its reverse position to move said device to its normal position for causing a normal operation of the switch in response to a like control impulse transmitted from the remote office.

16. Apparatus for a remote control system including, a railway switch, a remote office, a single communication channel between the switch and said office, a switch controlling device having a normal and a reverse position to govern the normal and reverse operations of the switch respectively, and means responsive to a first control impulse of current transmitted from the office over the communication channel to move the switch controlling device to the position opposite from that it already occupies to cause a corresponding operation of the switch and said means responsive to a second and like control impulse of current transmitted from the office over the communication channel to move the switch controlling device back to its original position to cause the switch to be operated back to the position which it is leaving.

17. In combination, a railway switch operating means, a polarized switch controlling relay having normal and reverse positions for governing the normal and reverse operation of the switch operating means respectively, a normal and a reverse control relay having an energizing circuit controlled in part by an impulse of control current from a remote office and in part by the position of said switch controlling relay, said circuit arranged that when the switch controlling relay is normal the reverse control relay is selected in response to the control impulse and when said switch controlling relay is reverse the normal control relay is selected in response to said control impulse, and circuit means governed by said normal and reverse control relays arranged to supply current of reverse polarity to the switch controlling relay when the reverse control relay is selected and to supply current of normal polarity to the switch controlling relay when the normal control relay is selected.

18. In combination, a railway switch operating means having normal and reverse positions, a polarized switch controlling relay having normal and reverse positions for governing the operation of the switch operating means to corresponding positions, a reverse and a normal control relay, an energizing circuit for each control relay controlled in part by a polar armature of the switch controlling relay, circuit means controlled by each control relay adapted when its control relay is energized to supply to the switch controlling relay current of a polarity to shift the said controlling relay to the position opposite from that which it occupied when the control relay was first energized, and a stick circuit for each control relay to shunt around said polar armature of the switch controlling relay.

19. In combination, a railway switch operating means, a normally deenergized polarized switch controlling relay having normal and reverse positions for governing normal and reverse positions of the switch operating means respectively, a pair of control relays, a pick-up circuit for the switch controlling relay controlled by said control relays arranged to energize said controlling relay with current of normal polarity when one control relay is selected and to energize the controlling relay with current of reverse polarity when the other control relay is selected, a stick circuit for said controlling relay shunting around the control relays, and means to open said stick circuit when an operation of the switch is completed.

20. In combination, a railway switch, a normally deenergized switch controlling relay, means controlled by said relay when energized for operating the switch, a control circuit to energize said relay for causing an operation of the switch, circuit means effective upon the completion of the operation of the switch to short-circuit said relay for causing a slow release of the relay, and indication means rendered active during the slow release period of said relay.

21. In combination, a railway switch, a normally deenergized switch controlling relay, means controlled by said relay when energized for operating the switch, a control circuit to energize said relay for causing an operation of the switch, means effective upon the completion of the operation of the switch to slowly release said switch controlling relay, and indication means controlled jointly by the switch and said relay rendered effective to transmit an indication impulse only during the releasing period of said controlling relay.

22. In combination, a railway switch, a normally deenergized switch controlling relay, means controlled by said relay when energized for operating the switch, a control circuit to energize said relay for causing an operation of the switch, an indication relay controlled by said switch effective to short-circuit the switch controlling relay upon the completion of said operation to slowly release said switch controlling relay, and indication means controlled by the indication relay rendered active during the release period of the switch controlling relay.

23. In combination, a railway switch, a slow releasing switch controlling relay, means controlled by said relay when energized for operating the switch, a control circuit to energize said relay for causing an operation of the switch, means effective upon the completion of an operation of the switch to deenergize said switch controlling relay, and switch indication means rendered effective to transmit an indication impulse only during the slow release period of the switch controlling relay.

24. In combination, a traffic governing device having different control conditions, a normally deenergized slow release control relay, means controlled by said relay when energized for governing the operation of the device, a control circuit to energize said relay for causing an operation of the device, means effective upon the completion of an operation of the device to deenergize said control relay, and indication means governed in accordance with the condition of the device rendered effective to transmit an indication impulse only during the slow release period of the control relay.

25. In combination, a railway switch, a normally deenergized switch controlling relay, means controlled by said relay when energized for operating the switch, a normally closed short-circuiting path for said relay, a control circuit effective to remove said short-circuiting path and to energize said relay for causing an operation of the switch, an indication relay controlled by the switch for closing said short-circuiting path upon the completion of said operation, and an indication means controlled by the indication relay rendered active during the release period of the switch controlling relay.

26. In combination, a railway switch having a normal and a reverse position, a switch operating means for moving the switch to said positions, a polarized switch controlling relay having a normal and a reverse position for governing the switch operating means to move the switch to its normal and reverse positions respectively, a polarized switch indication relay having a normal and a reverse position corresponding to said normal and reverse positions of said switch and normally energized to close a short-circuiting path on the switch controlling relay, a control means to deenergize said indication relay to open said short-circuiting path and to energize the switch controlling relay to cause a movement of the switch, means for energizing said indication relay at the completion of the movement of the switch, and an indication means to indicate the position of the switch controlled jointly by said switch controlling relay and said indication relay rendered active during the slow release period of the switch controlling relay.

27. Apparatus for a remote control system including, a railway switch, switch operating means for moving the switch, a remote office, a single line circuit between the office and the switch, control means responsive to control impulses sent over the line circuit from the office, indicating means at the switch to indicate the position of the switch, a normally deenergized switch controlling relay effective when energized to operate the switch operating means, circuit means controlled by said relay effective to connect said control means to the line circuit when said relay is deenergized and to connect said indicating means to the line circuit when said relay is energized, and other circuit means governed in part by the control means and in part by said switch for governing the energizing of said switch controlling relay.

28. In combination, a track section including a railway switch, a track relay for said section, a slow pick-up repeater relay controlled by said track relay, indication means controlled by the switch and by the track relay rendered active during the slow pick-up period of the repeater relay.

29. In combination, a track section including a railway switch, a normally energized track relay for said section, a normally energized slow pick-up repeater relay controlled by the track relay; and a switch indication circuit including contacts governed by the position of the switch, a front contact of the track relay and a back contact of the repeater relay.

30. In combination, a railway switch, a line circuit, means active upon the completion of a movement of the switch to supply to the line circuit different indication impulses in accordance with the position of the switch, an approach track section, a time element device rendered active under certain conditions in response to a train occupying the approach track section, and means controlled by the time element device for repeating the indication impulse corresponding to the position occupied by the switch.

31. In combination, a track section including a railway switch, a track relay for said section, a line circuit, means active upon the completion of a movement of the switch to supply to the line circuit different indication impulses in accordance with the position of the switch, an approach track section, a normally deenergized time element relay having a slow pick up, means to energize said time element relay in response to a train occupying the approach track section under certain conditions, and a circuit including a front contact of the time element relay and a front contact of the track relay effective to repeat the indication impulse corresponding to the position occupied by the switch.

32. A remote control system including, a track section having a railway switch, a control member, indicating devices associated with the control member selectively energized to indicate corresponding positions of the switch, a line circuit, means effective upon operation of said control member to deenergize the indicating devices and to supply over the line circuit a control impulse to actuate the switch, means responsive to a train occupying the track section to render the control impulse ineffective, and means rendered active as the train vacates the track section to reestablish the indicating device corresponding to the position of the switch.

33. In combination, a railway switch having normal and reverse positions, a switch controlling relay having normal and reverse positions to govern the corresponding operation of the switch, a line circuit, means for sending control impulses over the line circuit for selectively governing the switch controlling relay, a switch indication relay controlled by the switch, means controlled jointly by the switch indication relay and the switch controlling relay to supply to the line circuit an indication impulse upon the completion of a switch operation, and means for storing said switch indication impulse until the control impulse is removed from the line circuit.

34. A remote control system including, an office station, a field station, a railway switch at the field station, operating means for operating said switch, a line circuit, means at the office station to send over the line circuit a control impulse ordinarily of relatively short duration, receiving means at the field station responsive to the control impulse to render active said operating means, a switch indication means effective upon completion of an operation to supply to the line circuit a switch indication impulse, and means at the field station to store said indication impulse when an inordinately long control impulse persists after the operation is completed.

35. In combination, a railway switch having normal and reverse positions, a normally deenergized switch controlling relay adapted when energized to govern the operation of the switch to the respective positions, means controlled by the switch effective when the switch reaches full normal or full reverse position to deenergize said switch controlling relay with slow release characteristics, and other means effective to deenergize said controlling relay without slow release characteristics when the switch is in mid-stroke.

36. In combination, a railway switch, operating means for moving the switch to its normal and reverse positions but normally inactive, controlling means for rendering the operating means active in response to a control impulse, means rendered effective after the operating means has been active a predetermined time interval to move the switch to either its normal or reverse position to automatically cause the operating means to reverse the movement of the switch and return it to its original position, and means effective when the switch is returned to its original position to cause the controlling means to render the operating means inactive.

37. In combination, a railway switch having normal and reverse positions, an operating means to move the switch but normally inactive, controlling means selectively responsive to control impulses arranged to render the operating means active to move the switch to a corresponding position, means effective when the switch points encounter an obstruction that prevents the completion of the selected movement to automatically cause the operating means to return the switch to its original position, and means effective when the switch is returned to its original position to cause the controlling means to render the operating means inactive.

38. In combination, a railway switch, a polarized switch controlling relay having normal and reverse positions for establishing corresponding operations of the switch but normally deenergized, control means for selectively energizing the switch controlling relay, a normal time element relay rendered active by the normal position of the controlling relay, a reverse time element relay rendered active by the reverse position of the controlling relay, and circuit means controlled by said time element relays for causing the control means to automatically shift the polarized switch controlling relay to its opposite position and return the switch to the position it has left in response to a delay of predetermined time interval in the selected movement.

39. A remote control system including, an office station, a field station, a line circuit between said stations, a railway switch, operating means for moving the switch to its normal and reverse positions, means at the office station for sending over the line circuit control impulses for selectively governing the operating means, indication means controlled by the switch for sending over the line circuit impulses to indicate the position of the switch, and time element means rendered active by a control impulse for automatically causing the operating means to reverse the direction of movement of the switch when an obstruction delays for a given time interval the selected operation and then to establish a corresponding indication when the switch is returned to its original position.

40. A remote control system including, a railway switch, a receiving circuit comprising two parallel paths each including a half-wave rectifier and a control relay in series and arranged that one is responsive to current of positive polarity and the other to current of negative polarity, manually controlled means at a remote point adapted to send an impulse of alternating current to momentarily pick up both of said control relays, a normally deenergized storage relay having a pick-up circuit including front contacts of said control relays in series, a stick circuit for said storage relay, and switch controlling means governed by said storage relay.

41. A remote control system including, a railway switch, a receiving circuit comprising two parallel paths each including a half-wave rectifier and a control relay in series and arranged that one is responsive to current of positive polarity and the other to current of negative polarity, manually controlled means at a remote point adapted to send an impulse of alternating current to momentarily pick up both control relays, a normally deenergized storage relay having a pick-up circuit including front contacts of said control relays in series, a stick circuit for said storage relay closed only when said switch occupies either its full normal or full reverse position, and switch controlling means controlled jointly by said storage relay and by traffic governed means.

42. A remote control system including, a railway switch, signals to govern traffic over the switch in opposite directions, a polarized signal controlling relay arranged to clear the signal for one direction when energized with current of positive polarity and to clear the signal for the other direction when energized with current of negative polarity, a receiving circuit including an N relay responsive to current of positive polarity and an R relay responsive to current of negative polarity, a first remote control means to send alternating current to simultaneously energize both the N and the R relays to operate the switch, a second remote control means to send rectified pulses of alternating current of either positive polarity or of negative polarity to select either the N relay or the R relay to energize the signal controlling relay with current of either positive or negative polarity to clear corresponding signals, and means controlled by the signal controlling relay when energized with current of positive polarity to prevent the selecting of the R relay and when energized with current of negative polarity to prevent the selecting of the N relay.

43. In combination with a railway track section including a railway switch adapted to be at times hand operated and at times power operated, a track relay having a pick-up circuit controlled jointly by traffic conditions of the section and hand operation of the switch, a slow pick-up repeater relay for said track relay arranged to be energized when said track relay is picked up, controlling means located at a remote office to govern power operation of the switch, manually operated means located at the switch effective upon selection of hand operation of the switch to open the pick-up circuit of the track relay for rendering the controlling means ineffective to move the switch subsequent to a train occupying said track section, and means controlled by said two relays effective at the conclusion of hand operation of the switch and the vacating of the track section to transmit to the remote office an indication impulse corresponding to the position of the switch during the slow pick-up interval of the repeater relay for establishing an indication at the remote office that hand operation of the switch is concluded.

44. A remote control system including a single control circuit connecting two remotely located stations, a pair of loop circuits each including a relay at each station each adapted to pass current in one direction only and arranged for opposite directions, an operating mechanism at each station having different positions selectively controlled by the relays at its station, a battery at each station, control means at each station capable of reversibly supplying to the control circuit from its battery a steady direct current for selectively energizing the relays of loop circuits at the opposite station to establish a corresponding condition of the operating mechanism at that station, and said two control means so arranged that the two currents supplied at any given time flow in the same direction in the control circuit whereby control is simultaneously effected in both directions between the two stations, and means for preventing one battery from forming a short circuit path for the current supplied by the other battery.

45. A remote control system including, a control circuit, a pair of loop circuits receiving current from the control circuit each including a relay and a rectifier adapted to pass current in one direction only and said loop circuits arranged for opposite directions, an operating mechanism having different positions selectively controlled by said relays, a remotely located means adapted to cause a control current to flow in the control circuit in one direction or the other to energize the relay of the corresponding loop circuit for establishing a corresponding position of the operating mechanism, an indicating means including a current source adapted to supply to the circuit an indication current in accordance with the position of the operating mechanism and arranged that the indicating current flows in the control circuit in the same direction as the control current, and means controlled by each relay when energized to disconnect the other loop circuit from the control circuit.

46. A remote control system including, an office station, a field station, a pair of relays at the office station arranged for one to respond to current of positive polarity and the other to current of negative polarity, traffic governing means at the field station selectively responsive to current of positive and negative polarity, means at the office station adapted to at times supply either the positive or the negative half-wave pulses of an alternating current to selectively energize the corresponding relay of said pair of relays and to selectively control said traffic governing means at the field station, indication means at the field station controlled by the traffic governing means to transmit either the positive or the negative half-wave pulses of the alternating current and arranged to transmit the pulse opposite in polarity to the pulse transmitted from the office station for subsequently energizing the other relay of said pair of relays, and an indicating means at the office station selectively controlled by the sequence in which said pair of relays are energized.

47. A remote control system including, an office station, a field station, a pair of loop circuits at the office station and arranged for one to be energized by current of positive polarity and the other by current of negative polarity, manually controlled means at the office station adapted to at times supply current of either positive or negative polarity to selectively energize one or the other of said loop circuits and to selectively control a traffic governing means at the field station, indication means at the field station controlled by the traffic governing means to transmit current of either positive or negative polarity and arranged to transmit current opposite in polarity to the current being supplied at the office station for subsequently energizing the other of said pair of loop circuits, and an indicating means at the office station selectively controlled by the sequence in which said loop circuits are energized.

48. In combination, a railway switch having a first and a second position, an electric motor for operating the switch, manually controlled means having a given position for supplying current to said motor to operate the switch to the second position, a time element relay rendered active by the given position of the controlled means, means governed by the time element relay rendered effective at a predetermined time interval after said controlled means has been moved to said given position to deenergize the motor and to subsequently automatically supply current to the motor to operate the switch back to the first position, and means to render the time element relay inactive when the switch is moved to the second position prior to the expiration of said predetermined time interval.

49. A remote control system including, a pair of control wires connecting two remotely located stations, a source of alternating current at each station and said sources having different frequencies, a loop circuit at each station including a rectifier and a relay and arranged that one loop circuit passes current flowing in one direction and the other in the opposite direction, means to at times connect the loop circuits to the control wires, a control means at one station to at times connect its source to the control wires through a rectifier arranged to pass only the half-wave pulses passed by the loop circuit at the other station to energize its relay, an operating device controlled by said relay when energized to connect the source at said other station to the control wires through a rectifier arranged to pass only the half-wave pulses passed by the loop circuit at said one station to energize its relay, and means at each station for preventing the source at its station from short-circuiting the current supplied at the opposite station.

50. A remote control system including a pair of control wires connecting an office station and a field station, a pair of loop circuits at each station to receive current from the control wires and each including a rectifier and a relay in series, the two loop circuits at each station arranged reverse to each other, a source of alternating current at each of the two stations, a railway switch at the field station, operating means to move the switch to its normal and reverse positions and rendered active in response to simultaneous energizing of the relays of the field loop circuits, a control means at the office station to first connect its source to the control wires for a given interval to simultaneously energize the relays at the field station and then subsequently connect the office loop circuits to the control wires, indication means governed by the switch when operated to connect its source to the control wires through a rectifier adapted to pass the positive half-wave pulses or through a rectifier adapted to pass the negative half-wave pulses in accordance with the position of said switch to energize the relay of a corresponding office loop circuit, and a normal and a reverse indicating device selectively controlled by the relays of the office loop circuits.

51. A remote control system including a railway switch, a line circuit interconnecting the switch location with an office station, an electro-responsive means normally connected with said circuit at the switch location and influenced by current alternating in polarity, means governed by said electroresponsive means for operating the switch, two relays at the office station, asymmetric units associated with said relays for permitting current of one polarity but not of the other to pass through one relay and for permitting current of the other polarity but not of the first polarity to pass through the other relay, manually controlled means at the office station to supply to said circuit an impulse of current alternating in polarity to effect operation of the switch, means effective at the termination of said impulse to connect said relays with said circuit, indication means effective to disconnect said electroresponsive means from said circuit and to supply to the circuit an impulse of current of positive or negative polarity according to the position of the switch to energize the corresponding relay, indicating devices selectively controlled by said relays, and means to reconnect said electroresponsive means with said circuit at the termination of an indication impulse.

52. A remote control system including a railway switch, a line circuit interconnecting the switch location with an office station, an electro-responsive means normally connected with said circuit at the switch location and influenced by current alternating in polarity, means governed by said electroresponsive means for operating the switch, two relays at the office station, asymmetric units associated with said relays for permitting current of one polarity but not of the other to pass through one relay and for permitting current of the other polarity but not of the first polarity to pass through the other relay, manually controlled means at the office station to supply to said circuit an impulse of current alternating in polarity to effect operation of the switch, means effective at the termination of said impulse to connect said relays with said circuit, a source of alternating current at the switch location, asymmetric units associated with said source for supplying the positive half-wave pulses and not the negative half-wave pulses or vice versa, indication means effective at times to connect said source with said circuit for an interval to supply an impulse of positive half-wave pulses or an impulse of negative half-wave pulses according to the position of the switch for energizing a corresponding relay at the office station, and indicating devices selectively controlled by said office relays.

53. A remote control system including a stretch of railway having a track switch, operating means for moving the switch, a signal for governing traffic over said stretch, a single line circuit interconnecting said stretch with an office station, a first manually controlled means at the office station to transmit over the line circuit a relatively short impulse of current for governing said operating means to move the switch, a switch and a signal indicating device at the office station, switch indication means effective at the completion of an operation of the switch to return to the office station over the line circuit a short impulse of current to govern the switch indicating device for establishing an indication corresponding to the position of the switch, a second manually controlled means at the office station to continuously transmit over the line circuit time spaced control pulses of current for maintaining the clear position of said signal, signal indication means governed by the clear position of the signal to supply to the line circuit an indication pulse between each two consecutive control pulses to govern the signal indicating devices for indicating the position of the signal at the office station, means to render the second manually controlled means ineffective except after the completion of a switch indication impulse, and means for maintaining alternate relation of said signal control and said indication pulses.

54. A remote control system including a stretch of railway having a track switch, operating means for moving the switch, a pair of signals for governing traffic over the stretch in opposite directions, a single line circuit interconnecting said stretch with an office station, a first manually controlled means at the office station to transmit over the line circuit a relatively short impulse of alternating current for governing said operating means to move the track switch, a switch and a signal indicating device at the office station, switch indication means effective at the completion of an operation of the switch to return to the office station over the line circuit a short impulse of the positive or of the negative pulses of the alternating current to govern the switch indicating device for establishing an indication corresponding to the position of the switch, a second manually controlled means at the office station to continuously transmit over the line circuit either the positive half-wave pulses or the negative half-wave pulses of the alternating current for selectively clearing the signals, signal indication means for each signal governed by the clear position of its signal to supply to the line circuit the opposite pulse of the alternating current to govern the signal indicating device for indicating the position of the signal at the office station, means to render the second manually controlled means ineffective except after the completion of a switch indication impulse, and means to render the first manually controlled means ineffective as long as signal control and indication pulses are being alternately transmitted and received.

55. In a remote control system for railways, an office station and a field station connected by line wires, three consecutive sections of railway track at said field station, a track diagram at said office station representing said three sections, a first relay at the office station connected with said line wires and responsive only to current of one polarity in said line wires, a second relay at said office station connected with said line wires and responsive only to current of the other polarity in said line wires, two indicators controlled by said two relays respectively and each associated with an end section of said track diagram, means effective when either of the end sections at said field station is occupied to supply unidirectional current of a selected polarity to said line wires to energize a particular one of said relays and operate the indicator associated with the occupied section, and other means effective when the intermediate section only at the field station is occupied to supply alternating current to said line wires to energize both relays and operate both of said indicators to give a distinctive indication of the occupancy of said middle section.

56. In a remote control system for railways, an office station and a field station connected by line wires, three consecutive sections of railway track at said field station, a track diagram at said office station representing said three sections, a first relay at the office station connected with said line wires and responsive only to current of one polarity in said line wires, a second relay at said office station connected with said line wires and responsive only to current of the other polarity in said line wires, two indicators controlled by said two relays respectively and each associated with an end section of said track diagram, means including a first normally open contact responsive to the occupancy of the first track section to supply current of one polarity to said line wires to energize a particular one of said relays and operate the indicator associated with the first section, means including a second normally open contact responsive to the occupancy of the second track section only to supply current alternating in polarity to said line wires to energize both relays and operate both indicators to give a distinctive indication of the ocupancy of said second track section, and means including a third normally open contact responsive to the occupancy of the third section to supply current of the other polarity to said line wires to energize the other of said relays and operate the indicator associated with the third section.

57. In combination, a line circuit interconnecting two stations, two relays at one station connected with said circuit, asymmetric units associated with said relays for permitting current of one polarity but not of the other to pass through one relay and for permitting current of the other polarity but not of the first polarity to pass through the other relay, a first means at the other station to supply to said circuit alternating current to energize both relays simultaneously, a second means at the other station to supply to said circuit either the positive half-wave pulses or the negative half-wave pulses of alternating current to energize a particular one of the relays only, traffic controlling devices selectively controlled by said relays, and means effective when either relay is energized alone to prevent current being applied to the other relay but which is ineffective when both relays are simultaneously energized.

58. In combination, a line circuit interconnecting two stations, two relays at one station connected with said circuit, asymmetric units associated with said relays for permitting current of one polarity but not of the other to pass through one relay and for permitting current of the other polarity but not of the first polarity to pass through the other relay, a first means at the other station to supply to said circuit alternating current to energize both relays simultaneously, a second means at the other station to supply to said circuit either the positive half-wave pulses or the negative half-wave pulses of alternating current to energize a particular one of the relays only, traffic controlling devices selectively controlled by said relays, and means controlled by said relays effective to prevent both relays being energized by full-wave alternating current if either one of the relays is energized by half-wave pulses.

59. In combination, a railway switch having a first and a second position, an electric motor for operating the switch, manually controlled means having a given position for supplying current of one polarity to said motor to operate the switch to the second position, a time element relay, a circuit for said relay operative in said given position of said controlled means to supply current to the relay independent of the current supplied to said motor, means governed by the time element relay rendered effective at a predetermined time interval after said relay is supplied with current to deenergize the motor and to then supply current of the other polarity to the motor to operate the switch back to said first position, and means governed by said second position of the switch for cutting off the supply of current to said relay.

60. A remote control system including, a pair of control wires connecting two remotely located stations, a source of alternating current common to both stations, a loop circuit at each station connected with said wires and including a rectifier and the operating winding of a relay, said loop circuits arranged that one passes current flowing in one direction and the other passes current flowing in the opposite direction, a control circuit at each location connected across said wires and including a rectifier operable to supply current to the wires which flows in the direction passed by the lop circuit at the other station for energizing the relay of that loop circuit, means at each station to normally supply current to its control circuit for said common source of alternating current, other means at each station effective upon loss of power from said common source to supply current from the auxiliary source to the control circuit, and means at each station effective to prevent the auxiliary source of the same station from short circuiting the current supplied to the control wires at the other station.

61. A remote control system including a pair of control wires connecting two remotely located stations; a source of alternating current at each station each source including a battery, a tuned alternator and a transformer; said tuned alternators tuned for different frequencies for causing said sources to supply currents of different frequencies, a loop circuit at each station including a rectifier and a relay and arranged that one loop circuit passes current flowing in one direction and the other in the opposite direction, a control means at one station to at times connect the secondary winding of the transformer of its source to the control wires through a rectifier disposed to pass only the half-wave pulses passed by the loop circuit at the other station to energize the relay of that loop circuit, an operating device controlled by said relay when energized and effective to connect the secondary winding of the transformer of the source at said station to the control wires through a rectifier disposed to pass only the half-wave pulses passed by the loop circuit at said one station to energize the relay of that loop circuit, and a resistor at each station interposed between the secondary winding of the transformer and one of the control wires to prevent that winding from short-circuiting the current supplied to the control wires at the other station.

62. In combination, a control circuit consisting of two conductors extending between two remote locations, a battery at one location having a center terminal permanently connected with one of said conductors, a first and a second relay, an operating circuit for the first relay including a back contact of the second relay as well as a winding of said first relay, an operating circuit for the second relay including a front contact of the first relay as well as a winding of said second relay for causing said relays to be alternately operated, means including a back contact of said first relay to connect one outside terminal of the battery with the other conductor for supplying impulses of current of normal polarity to the control circuit, means including a front contact of the first relay to connect the other outside terminal of the battery to said other conductor for supplying impulses of current of reverse polarity to the control circuit, a pair of loop circuits at the second location receiving current from the control circuit each including a relay and a rectifier disposed to pass current in one direction only and said loop circuits arranged for opposite directions, an operating mechanism, means controlled by the relays of said loop circuits and effective to govern said mechanism when and only when both of the relays are picked up.

63. A remote control system including a pair of control wires connecting an office station and a field station, a pair of loop circuits at the field station each connected across said wires and each including a rectifier and a relay, said loop circuits arranged that one passes current flowing in one direction and the other passes current flowing in the opposite direction, a source of alternating current at the office station having one terminal permanently connected to one of said wires, a first and a second manually operable means at the office station, means controlled by the first manually operable means when operated to connect the other terminal of the source with the other control wire to supply said loop circuits with alternating current, means controlled by the second manually operable means when operated to connect the other terminal of the source to the other wire through one or the other of two rectifiers disposed reverse to each other to supply to said loop circuits either the positive half-wave pulses of the alternating current only or the negative half-wave pulses of the alternating current only, a lockout relay at the office station having a front contact interposed in said other wire, and an energizing circuit means for said lockout relay controlled by the manually operated means and effective only when one of the manually operable means is operated whereby said source is ineffective to supply energy except subsequent to operation of one or the other manually operable means.

64. In a centralized traffic controlling system for railroads, a control office, a field station, a line circuit connecting said control office and said field station, a means for controlling a first device at said field station by selecting the direction of pulsating current in said line circuit, a means for controlling a second device at said field station by selecting the direction of pulsating current in said line circuit, and means for changing the control of said first device to the control of said second device by momentarily energizing said line circuit with alternating current.

65. In a railway centralized traffic controlling system, a control office, a field station, a first line circuit connecting said control office and said field station, a track switch and associated signals at said field station, an alternating current source of energy, means including rectifiers at said control office and rectifiers at said field station for controlling either said track switch or said signals from said control office in accordance with the energization of said first line circuit, a second line circuit connecting said control office and said field station, and means including rectifiers at said control office and rectifiers at said field station for indicating at said control office the position of said track switch and said signals and the presence of a train on said track switch in accordance with the energization of said second line circuit.

66. In combination, two spaced locations, a line circuit connecting said spaced locations, first and second devices at one of said spaced locations, means for at times controlling said first device by energizing said line circuit with pulsating current of one or the other polarity at said other location, means for at times controlling said second device by energizing said line circuit with pulsating current with one or the other polarity at said other location, and means for automatically selecting whether said first or said second device is to be controlled by the particular energization of said line circuit.

67. In combination, two spaced locations, a line circuit connecting said spaced locations, first and second devices at one of said spaced locations, means for at times controlling said first device by energizing said line circuit with pulsating current of one or the other polarity at said other location, means for at times controlling said second device by energizing said line circuit with pulsating current with one or the other polarity at said other location, and means for determining that said second device is to be controlled, which means is rendered effective by temporarily energizing said line circuit with alternating current.

68. In combination, two neutral relays which can be selectively controlled so that either or both may be energized or both may be deenergized, a first and a second device, means for distinctively controlling said first device in accordance with which particular one of said relays is energized after both said relays have been deenergized, and means for distinctively controlling said second device in accordance with which particular one of said relays is energized after both of said relays have been energized.

69. In combination, two neutral relays which can be selectively controlled so that either or both may be energized or both may be deenergized, a first and a second device, means for distinctively controlling said first device in accordance with which particular one of said relays is energized only after both said relays have been deenergized, and means for distinctively controlling said second device in accordance with which particular one of said relays is energized only after both of said relays have been energized.

70. In a railway centralized controlling system, a control office, a field station, a track switch and associated signals at said field station, track switch control means and a signal control lever at said control office, a first line circuit and a second line circuit each connecting said control office and said field station, means for indicating at the control office the condition of said track switch and associated signals over said second line circuit, means for controlling said signals over said first line circuit only when the indicated condition of said track which corresponds to the position to which said track switch is moved in response to an operation of said track switch control means, and means for controlling said track switch over said first line circuit only when said signals are placed at stop.

71. In a railway centralized traffic controlling system, a control office, a field station, a track switch and associated signals at said field station, track switch control means and a signal control lever at said control office, a first line circuit and a second line circuit each connecting said control office and said field station, means for indicating at the control office the condition of said track switch and associated signals over said second line circuit, means for clearing said signals over said first line circuit only when the indicated condition of said track switch corresponds to the position to which said track switch is moved in response to an operation of said switch control means, means for retaining an existing cleared signal irrespective of a subsequent operation of said track switch control means, and means for controlling said track switch by said track switch control means over said first line circuit.

72. In combination, a control circuit, a main source of energy of one character, means for at times connecting said main source of energy to said control circuit, an auxiliary source of energy of another character, a device for converting the energy of said other character into the energy of said one character, and means effective when said main source is absent for at times connecting said device between said control circuit and said auxiliary source to supply said control circuit with current of said one character even though said main source of energy is not available.

73. In combination, a control circuit, a main source of alternating current, a power-off relay connected to said main source, means for at times connecting said main source to said control circuit provided said power-off relay is picked up, an auxiliary source of direct current, a device for converting direct current into alternating current, and means effective when said power-off relay is released for at times connecting said device between said control circuit and said auxiliary source to supply said control circuit with alternating current even though said main source is absent.

PAUL H. CRAGO.

CERTIFICATE OF CORRECTION.

Patent No. 2,124,651. July 26, 1938.

PAUL H. CRAGO.

It is hereby certified that error appears in the printed specification of the above numbered patent requiring correction as follows: Page 28, second column, line 32, claim 53, for the word "devices" read device; page 29, second column, line 48, claim 60, for "lop" read loop; page 30, first column, line 73, claim 64, for "controlling" read control; page 31, first column, line 12, claim 70, for "which" read switch; and that the said Letters Patent should be read with this correction therein that the same may conform to the record of the case in the Patent Office.

Signed and sealed this 13th day of September, A. D. 1938.

Henry Van Arsdale (Seal) Acting Commissioner of Patents.